(12) United States Patent
Almecija et al.

(10) Patent No.: US 11,372,657 B2
(45) Date of Patent: Jun. 28, 2022

(54) SYSTEMS AND METHODS FOR ADAPTIVE USER INTERFACES

(71) Applicant: General Electric Company, Schenectady, NY (US)

(72) Inventors: Thomas Almecija, Boulogne-Billancourt (FR); Antoine Aliotti, Buc (FR); Chloe Adam, Buc (FR)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 17/224,944

(22) Filed: Apr. 7, 2021

(65) Prior Publication Data
US 2021/0294617 A1 Sep. 23, 2021

Related U.S. Application Data

(63) Continuation of application No. 15/624,854, filed on Jun. 16, 2017, now Pat. No. 11,036,523.

(51) Int. Cl.
| | |
|---|---|
| G06F 9/451 | (2018.01) |
| G06F 3/04847 | (2022.01) |
| G06F 3/0482 | (2013.01) |
| G06N 5/04 | (2006.01) |
| G06N 20/00 | (2019.01) |

(52) U.S. Cl.
CPC ............ *G06F 9/451* (2018.02); *G06F 3/0482* (2013.01); *G06F 3/04847* (2013.01); *G06N 5/04* (2013.01); *G06N 20/00* (2019.01)

(58) Field of Classification Search
CPC .... G06F 9/451; G06F 3/04847; G06F 3/0482; G06N 20/00; G06N 5/04
See application file for complete search history.

(56) References Cited

U.S. PATENT DOCUMENTS

| | | | |
|---|---|---|---|
| 6,633,315 B1 | 10/2003 | Sobeski et al. | |
| 6,828,992 B1 | 12/2004 | Freeman et al. | |
| 8,046,313 B2 | 10/2011 | Hoffberg et al. | |
| 8,453,058 B1 | 5/2013 | Coccaro et al. | |
| 8,467,715 B2 | 6/2013 | Morita et al. | |
| 8,589,330 B2 | 11/2013 | Petersen et al. | |
| 2005/0015276 A1* | 1/2005 | Sullivan ................ | G16H 50/20 705/2 |
| 2005/0015728 A1 | 1/2005 | Ragan, Jr. et al. | |
| 2006/0190822 A1 | 8/2006 | Basson et al. | |

(Continued)

OTHER PUBLICATIONS

Morzy, T. et al., "Implementing Adaptive User Interface for Web Applications," Intelligent Information Processing and Web Mining: Proceedings of the International IIS Conference (IIPWM'03), Jun. 2, 2003, Zakopane, Poland, 8 pages.

(Continued)

*Primary Examiner* — Keith D Bloomquist
(74) *Attorney, Agent, or Firm* — Lucas Divine; McCoy Russell LLP

(57) ABSTRACT

Methods and system for adapting user interfaces are proposed. According to certain embodiments, a user experience level is determined based on usage of a software application and other detected factors. Based on the user experience level, at least in part, a user interface is adapted to provide an improved experience for the user of the adaptive user interface.

20 Claims, 19 Drawing Sheets

(56) References Cited

U.S. PATENT DOCUMENTS

| | | |
|---|---|---|
| 2010/0063774 A1 | 3/2010 | Cook et al. |
| 2011/0304550 A1 | 12/2011 | Romera Jolliff et al. |
| 2012/0036448 A1* | 2/2012 | John ................ G06Q 30/0201 |
| | | 715/744 |
| 2014/0052678 A1 | 2/2014 | Martinez et al. |
| 2015/0088422 A1* | 3/2015 | Nikovski ............... G01C 21/36 |
| | | 701/538 |
| 2015/0178620 A1 | 6/2015 | Ascari et al. |
| 2016/0259401 A1 | 9/2016 | Kelly et al. |
| 2016/0259501 A1* | 9/2016 | Nagarajan ............... G06F 9/451 |
| 2017/0031575 A1* | 2/2017 | Dotan-Cohen ..... G06F 3/04847 |
| 2017/0249549 A1 | 8/2017 | Bai |
| 2017/0255868 A1 | 9/2017 | Gelinas et al. |
| 2018/0232658 A1 | 8/2018 | Acharya |

OTHER PUBLICATIONS

Reinecke, R., "Cuturally adaptive user interface," Master of Engineering Dissertation, University of Zurich, Department of Economics, Business Administration and Information Technology, May 2010, 261 pages.

\* cited by examiner

SYSTEMS AND METHODS FOR ADAPTIVE USER INTERFACES

CROSS-REFERENCE TO RELATED APPLICATIONS

This application is a continuation of U.S. patent application Ser. No. 15/624,854, titled SYSTEMS AND METHODS FOR ADAPTIVE USER INTERFACES, and filed Jun. 16, 2017, the entire contents of which is hereby incorporated by reference for all purposes.

TECHNICAL FIELD

The subject matter disclosed herein relates generally to software and hardware systems with user interfaces ("UI"), and more particularly adaptive user interfaces.

BACKGROUND

Computer hardware systems have gotten increasingly powerful and complex. Software applications that run on computer hardware systems have similarly increased in complexity and features. With each new release of a software, its designers are encouraged to provide ever more features that give value-add to customers. Further, complex tasks and issues, such as for example in the movie, artistic, or healthcare industries, require complex software capabilities. Accordingly, user interfaces for software applications have had a hard time finding a good balance between providing an easy to understand and navigate interface showing various options for selection without being confusing or overwhelming.

Users of computer software applications are increasingly diverse in capability. Some users are sophisticated users of all software and know how to explore the various menus, buttons, toolbars, and interface features to learn a new user interface. Some users are sophisticated users but only as it comes to a single software application or application suite. Some users are new to a software application and can become sophisticated with proper training. Some users dislike having to learn any new software and prefer to understand a few features and use them instead of becoming more sophisticated on the whole software. Some users dislike software in general and want the tools to do most of the selections without their direct input. Some users prefer or only can use certain input types or paradigms, for example only preferring voice input and shunning keyboard input. And many other user types exist. It can be a problem for a user interface to be able to support the variety of users that may encounter it.

User interface designers generally do not have good tools to understand how the users of their software are using it and how to automatically improve the user interface to maximize user time and reduce user annoyance. In settings such as the healthcare industry, less time in the software to diagnose an issue or find certain information can even save lives and improve healthcare for large parts of the population. Systems and methods for improving understanding of how a user interface is utilized by users, along with proposing improved user interface design automatically, would be very useful to user interface designers as well as users of software applications.

BRIEF DESCRIPTION

In accordance with an embodiment, a system for adaptive user interfaces is provided that can include a user interface output component that outputs a first user interface to at least one output device; an input device that receives input user actions from a user interacting with the first user interface; an input tracking component that registers user actions received from the input device; a user experience determination component that determines a user experience level for the user; a user experience learning component that performs a prediction of the next intended action of the user based on at least the registered user actions; a user interface adaptive component that generates an adapted user interface based on the user experience level and the prediction of the next intended action; wherein the user interface output component outputs the adapted user interface. The user experience level may be determined from a direct selection by the user. The user experience level may be determined from current session user interaction history, retrieved past session user interaction history, and user profile information. User profile information can include at least one of job title, software access level, training classes taken pertaining, and location.

Further, the adapted user interface can be output in a different user interface paradigm than the first user interface. The user experience learning component can apply at least one of machine learning, deep learning, or a neural network to analyze the registered user actions and perform the prediction of the next intended action. The adapted user interface can have less user interface buttons than the first user interface. The adapted user interface can have more user interface buttons than the first user interface. The adapted user interface can provide hinting related to the next predicted user actions. The system and further include an action automation component that determines if the prediction of the next intended action is an action that is easily reversible and has an obvious effect to the user; and, if so, automates the next action such that the system performs the action without requiring explicit user input.

In accordance with an embodiment, a method for an adaptive user interface is provided that can include the steps of outputting a first user interface to a user; receiving input action from a user interacting with first user interface; recording the input action; updating a training base with the input action; provide a prediction of the next user action based on the training base; determining a user experience level for the user; and outputting an adapted user interface based on at least one of the predicted next user action and the user experience level. The adapted user interface may include user interface hinting, dynamic shortcuts, or automation of specific tasks. The adapted user interface can have less user interface buttons than the first user interface. The adapted user interface can have more user interface buttons than the first user interface. The user experience level can be determined from current session user interaction history, retrieved past session user interaction history, and user profile information.

In accordance with an embodiment, a method for an adaptive user interface is provided that can include the steps of retrieving user interface interaction history for a user; registering input actions of the user interacting with a first user interface; determining the user experience level of the user based on the user interface interaction history for the user and the registered input actions of the user; adapting a user interface based on the user experience level of the user; and outputting an adapted user interface. The method can include further steps of applying a learning component to the user interface interaction history and registered input actions for the user to assign a user grouping; and wherein the adapted user interface is further based on the user grouping.

The user experience level can be determined for the specific software application and user interface paradigm. The user experience level can be further based on user profile information that includes at least one of job title, software access level, training classes taken, and location. The adapted user interface can have less buttons than the first user interface if the user has no user interface interaction history.

BRIEF DESCRIPTION OF THE DRAWINGS

FIG. 12 shows an adaptive user interface, according to an embodiment.

FIG. 13 shows another adaptive user interface, according to an embodiment.

FIG. 15 shows a user interface with user hints, according to an embodiment.

DETAILED DESCRIPTION

Figure 1:
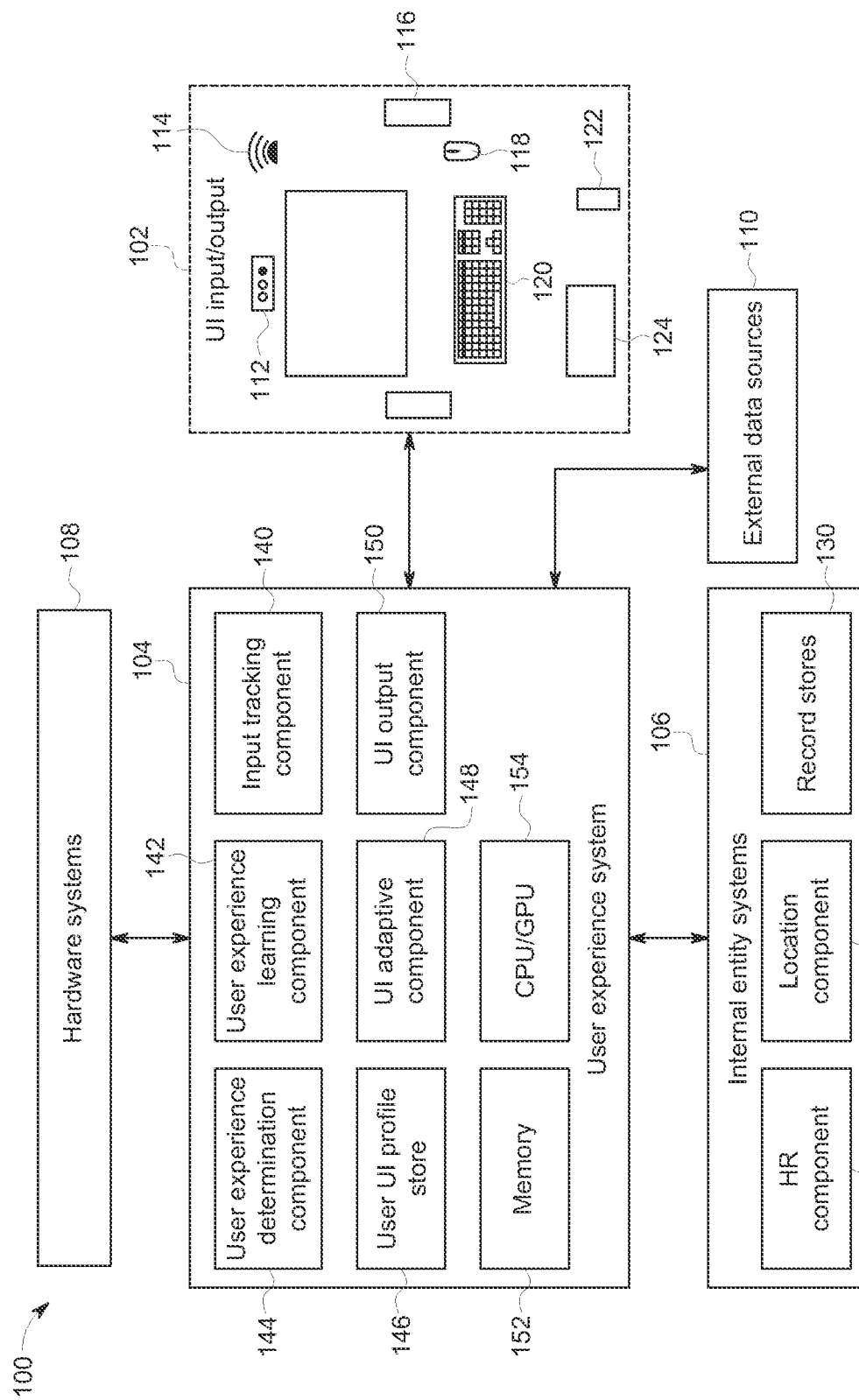
FIG. 1 shows a system including a user experience environment, according to an embodiment.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and other changes may be made without departing from the scope of the subject matter of this disclosure. The following detailed description is, therefore, provided to describe an exemplary implementation and not to be taken as limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Herein proposed are systems and methods to learn about users to determine the type of user, experience level, and working habits. The system can then tailor and/or adapt the user interface (imaging layouts, menu, buttons, toolbars, tools options, learning hints, input/output devices, etcetera) based on the determined type of user and experience user, as well as additional considerations that will be discussed herein throughout. The systems and methods for adaptive user interfaces determine what to present to the user, when to present it and how to present it. Further, the systems and methods for adaptive user interfaces determine when to not provide any user interface, instead inferring the actions the user would like and automatically automating or performing those actions based on user intent, history, experience level, and other factors described herein.

These adaptive user interfaces do not just affect a single user interface experience or screen. The whole software application workflow of completing a task that may require many steps/screens/buttons can be improved by adapting the workflow and user interface throughout the workflow. The user's workflow and user interfaces can be adapted dynamically and automatically.

According to some embodiments, systems and methods herein provide a user interface with the most probable next actions of the user presented as options on the user interface. Thus, the user interface can adapt to the user behavior and history of using the software application. An example of an adaptive UI in an embodiment is a list of shortcuts that is updated regularly based on user past actions. Additional examples of an adaptive UI in various embodiments are moving less-used interface elements out of the way, automating frequently used combinations into single clicks, as well as tutorial or workflow hints to help basic users learn the software application quicker and with greater ease.

As an example, during their daily work, a user may perform repetitive actions that induce a lot of mouse travel. Systems and methods herein optimize user workflow and mouse travel by showing the next most probable actions the user will want to perform. And in some cases the system may automatically do certain actions that may no longer need explicit user interaction or automate them into a single step, especially when the prediction system for a particular user achieves a high level of reliability. The next most probable actions are computed dynamically and the user interface can be adapted on-the-fly. The most probable actions are shown to the user in easy to user form while other actions are available, but may be less visible to the user.

FIG. 1 shows a system including a user experience environment 100, according to an embodiment. FIG. 1 includes user UI input/output ("IO") 102. User IO 102 includes input and output devices that are used for computer systems. User IO can include camera unit 112, which may include stereoscopic cameras as well as a depth infrared camera, microphone 114, speaker 116, mouse 118, keyboard 120, touchpad 122, and mobile device 124 which may be a smartphone, tablet, or other system that has its own array of input and output devices. Augmented reality, virtual reality, gaming systems, and other input/output systems are contemplated as part of user IO 102 as well. Other input and output systems may connect via cables or wireless standards. For example, an input or output device may be remote and send input signals from a remote location to user IO 102 via the internet.

FIG. 1 includes user experience system 104. User experience system includes an input tracking component 140, user experience learning component 142, user experience determination component 144, user UI profile store 146, UI adaptive component 148, UI output component 150, memory 152, and CPU/GPU 154. CPU' stands for central processing unit. GPU stands for graphics processing unit. The user experience system 104 works with user IO 102, internal entity systems 106, hardware systems 108, and/or external data sources 110 to provide adaptive user interfaces for users of user experience environment 100. Internal entity systems 106 includes HR (human resources) component 126, location component 128, and record stores 130, among other computer systems and software within the entity.

Figure 6:
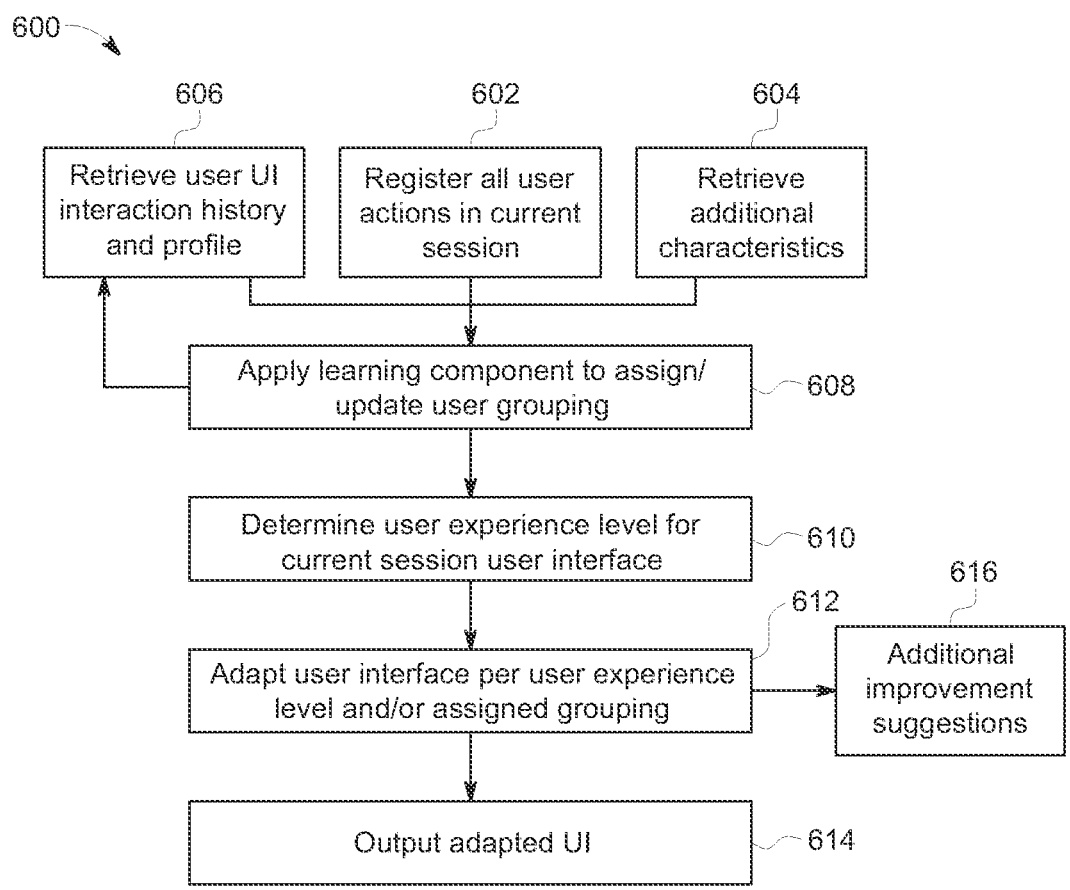
FIG. 6 shows a process for determining a user experience level and adapting a user interface, according to an embodiment.

An example process of the operation of the user experience environment 100 can be shown with reference to FIG. 6. FIG. 6 shows a process 600 for determining a user experience level and adapting a user interface, according to an embodiment. Steps within process 600 may be executed by CPU/GPU 154 or processing abilities of various components within the components within the user experience system 104.

At step 602, user experience system 104, through input tracking component 140 in an embodiment, registers all user actions in the current UI session. These are received from user IO 102. The actions can be registered from the plurality of various input devices of user IO 102, as discussed above. Thus, this step tracks the current user's use of the user interface. The user IO 102 could be a local input through a cord or local wireless connection. The actions of the user can be transmitted over a network such as a local area network or a global network such as the internet. Thus, user experience system 104 does not have to be physically near user IO 102, but it may be in certain applications or embodiments.

At step 604, user experience system 104 retrieves additional characteristics. These characteristics may be about the technology used in the system, the situation of the user (such as a type of medical exam or software application state), patient scheduling, location of personnel (such as information technology ("IT") support or an advanced user of the application nearby), and other characteristics that will be discussed herein or that would be reasonably known to one skilled in the art. These additional characteristics can be retrieved from within user experience system 104 in one or more components or memory 152. These additional characteristics can be retrieved from external data sources 110, hardware systems 108, and/or internal entity systems 106. Additional characteristics can include the various factors discussed with relation to FIG. 7.

At step 606, user experience system 104 retrieves user UI interaction history and profile. Each user has a profile that is dynamically created. This profile includes their user interface actions, history, and preferences, as well as other information about them that may affect how a UI is adapted. These can be stored, and retrieved from, user UI profile store 146.

At step 608, user experience system 104, through user experience learning component 142 in an embodiment, applies a learning component to assign and/or update one or more user groupings. This is an initial step in determining how to adapt a user interface. User experience learning component 142 may include deep learning, machine learning, and/or artificial intelligence principles to assign and/or update the user groupings. User experience learning component 142 learns and groups individuals across all of the various software applications and over time. Thus, it learns and develops an understanding of overall usage of the UI to group certain patterns and usages with similar patterns and usages. This is discussed further in relation to FIG. 5 and FIG. 7, among other places within. The user experience learning component 142 can automatically determine changes and patterns in the user's UI behavior and needs. For example, a user may have a similar way of working most sessions, but one session clicking buttons fast and furiously (i.e. shorter intervals between button clicks and faster mouse travel). Thus, the system can learn to group the user into a "speed needed" or "urgent" grouping that may dynamically update the user interface to show only the one anticipated next action or even automate some actions that would normally be clicks by the user in order to save time. Each time user experience learning component 142 is applied, the UI system can improve in its understanding of user needs and preferences, and thus output improved adapted user interfaces.

At step 610, user experience system 104, through user experience determination component 144 in an embodiment, determines a user experience level for the current session of the user interface. The user experience determination is not always a single determination. User experience determination component may determine the user's experience level with the particular UI screen/workflow, with the software application as a whole, or even a software application suite (especially in cases where the user experience paradigm is similar between software applications within the software application suite), as examples.

The user experience determination component 144 may also determine whether the user experience level includes a less or higher desire to learn. If a user uses help menus frequently or clicks buttons just to learn what they do, user experience determination component 144 may rate them as a user with a higher desire to learn. The system may then provide further video, text, or image help and hints to further that user's developments when the UI is adapted for that user. Alternatively, a user who clicks harder in frustration, is a single time user to the software application, or clicks more when an application is slow may be someone determined as having a less desire to learn. The learning component can learn based on patterns which type of users may have a less or higher desire to learn.

At step 612, user experience system 104, through UI adaptive component 148 in an embodiment, adapts a user interface per user experience level and/or assigned grouping. Adapting the user interface can mean re-sizing the screen, changing the layout, reducing or adding buttons, changing menus, altering what content is shown, changing fonts, changing paradigms (e.g. visual to audible), changing icons, re-arranging UI assets, and more. Examples are shown throughout this description and in the figures. That said, they are merely some examples in some embodiments and are not meant to be limiting as to claim scope. User experience and user interface designers of skill in the art would recognize the wide variety of ways such a UI adaptive component can be set to adapt a user interface.

At step 614, user experience system 104, through UI output component 150 in an embodiment, outputs the adapted UI to user IO 102. This includes compiling whatever UI assets, images, sounds, and the like are needed. These may be stored in memory 152, a hard drive in hardware systems 108, and/or a remote storage device in an external data source 110. At this point a user has an improved user interface experience based on the user experience system adapting the user interface particularly to the user, the user's hardware, and the user's situation. The whole process 600 can take place almost instantaneously so that the user sees the UI adapt in real-time.

At step 616, user experience system 104 optionally outputs additional improvement suggestions. Additional improvement suggestions can be automatically generated by user experience system 104 as well as received through a direct query to the user asking them how they'd like to see the user interface improved. These improvement suggestions can be output to the creators or designers of the software. The creators or designers of the software can then review the improvement suggestions for potential permanent changes or improvements to the software application or software application suite. Thus, the process 600 improves both the immediate user experience of the user interface and the long-term user interface of the system as improved by its creators or designers.

Figure 2:
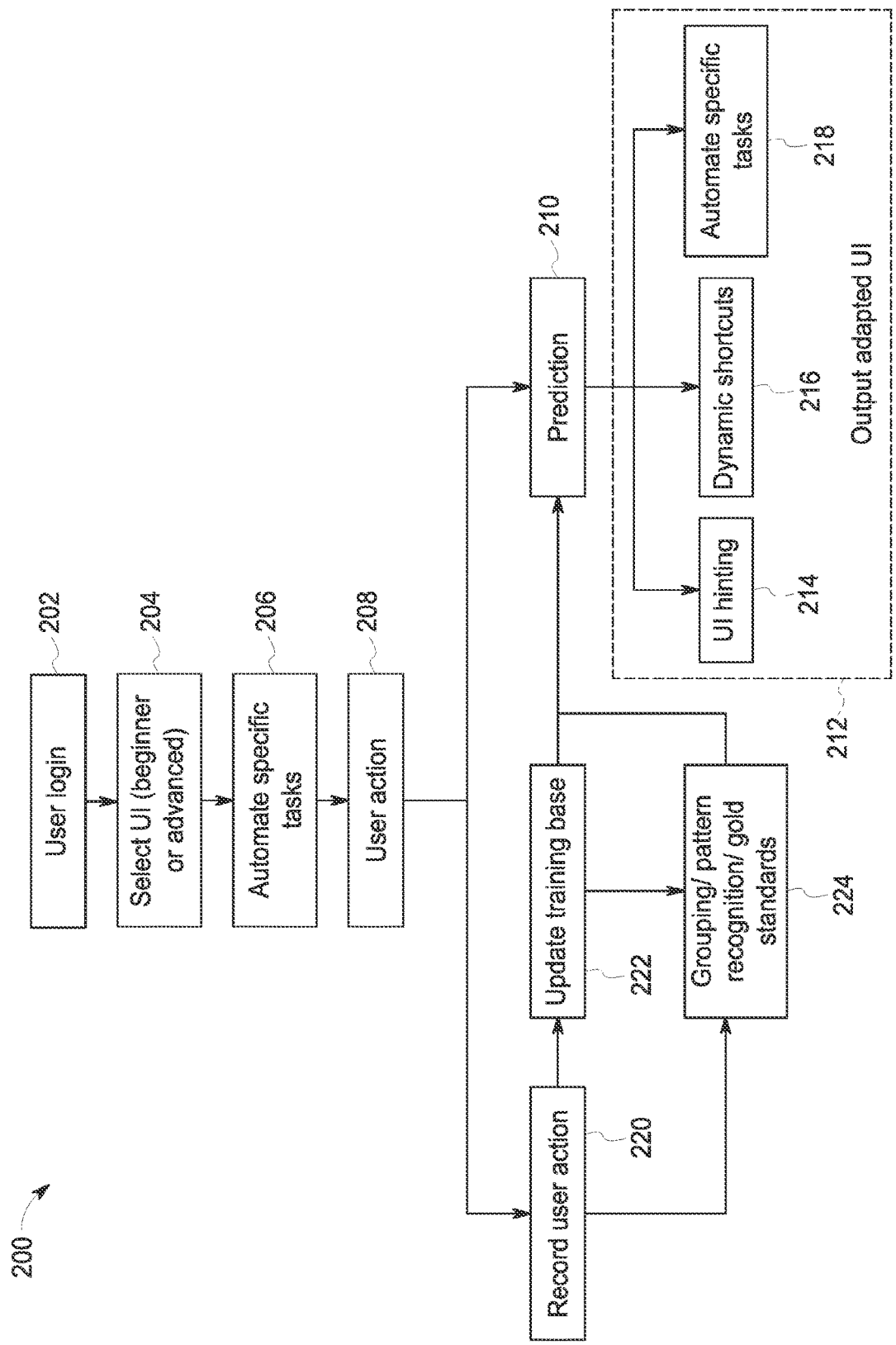
FIG. 2 shows a process for using a user experience system to adapt a user interface, according to an embodiment.

Another example process of the operation of the user experience environment 100 can be shown with reference to FIG. 2. FIG. 2 shows a process 200 for using a user experience system to adapt a user interface, according to an embodiment.

At step 204, an initial user interface is selected. This can be a simple selection of a beginner user experience level user interface or advanced user interface in some embodiments. In alternate embodiments, there may be a sliding scale where the selection is along a scale from beginner on one end and advanced on another, like a score from 1 to 100 in an example. In alternate embodiments, a certain number of options are available, such as beginner, moderate, and advanced. The selection can be made automatically by the user experience determination component 144, by the user directly with no assistance from user experience system 104, by a setting in an options menu or the like, or through a suggestion by user experience determination component 144 that the user reviews and selects the desired UI.

Figure 5:
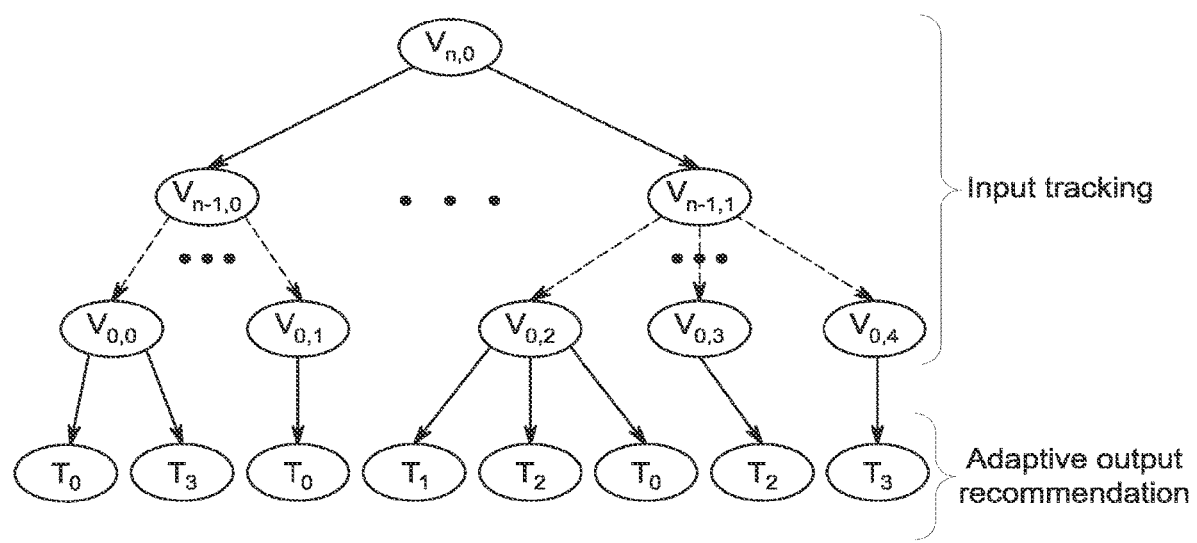
FIG. 5 shows systems and methods for tracking user input, according to an embodiment.
Figure 7:
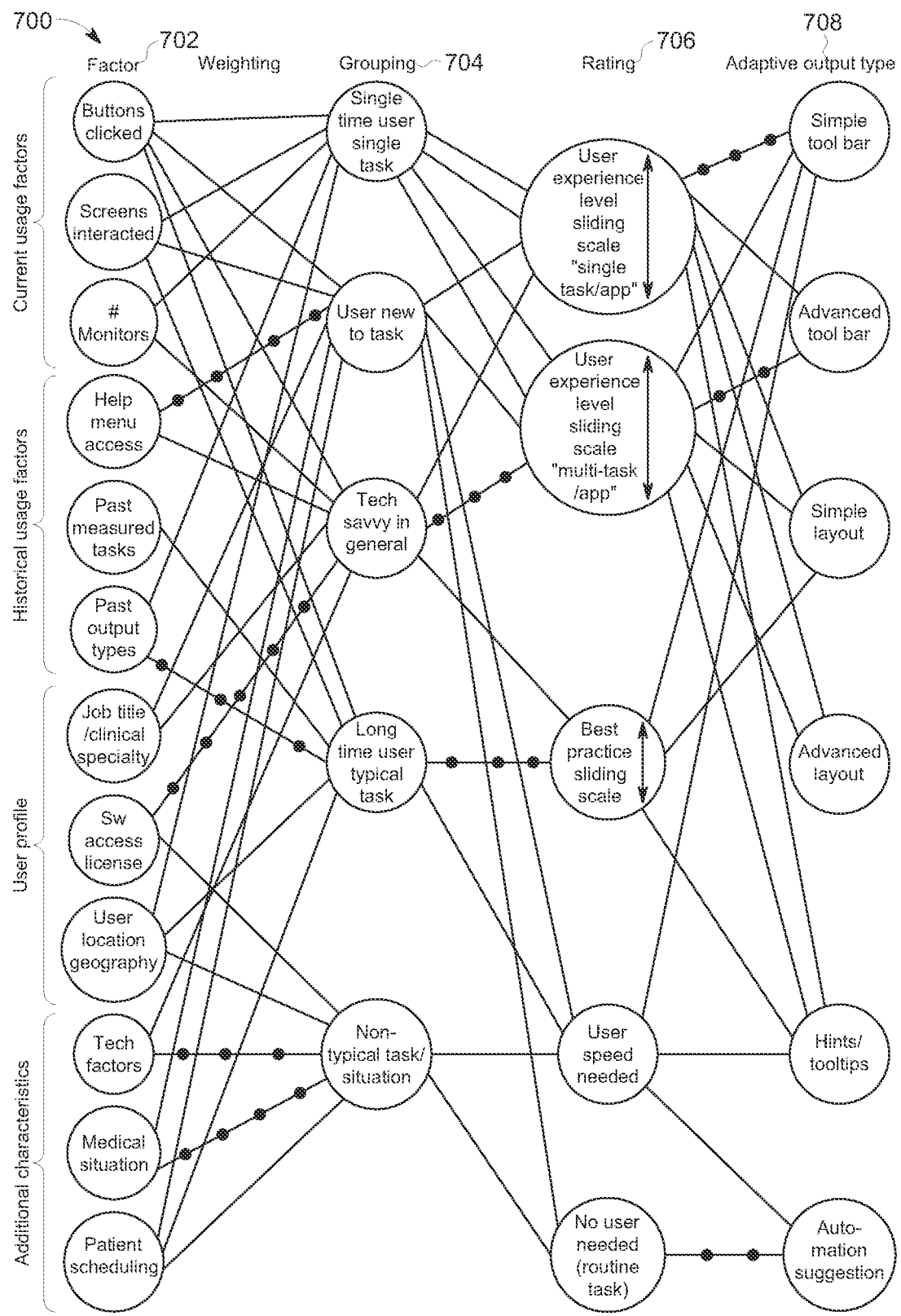
FIG. 7 shows a neural network for grouping, rating, and adaptive output type, according to an embodiment.

As discussed above, the user experience determination component determines a user experience level based on many factors, such as historical usage of the user interface, user profile, current usage, and other factors discussed herein, especially in regards to FIG. 5 and FIG. 7. A pattern of a user's activity can be compared with patterns of other beginner, moderate, and advanced users for various group activities and the system can continue to learn and change the relative grouping through user experience learning component 142.

One example is that if a user uses the help menus more than an average amount, the user may be grouped into the "beginner" group and/or the "higher desire to learn" group. Another example is that if a user has logged in to this software application less than ten times, they may be grouped into the "beginner" group. But if that same user has logged into a software application in a software application suite that has a similar UI as the currently used software over 100 times, they may not be grouped in the "beginner group" and may be put into another group such as "advanced UI multi-app" (as shown more in FIG. 7). Another example is that if a user has clicked buttons in the UI over a threshold amount, they are no longer a beginner user. Another example is if a user is listed as a technical programmer in their profile, they may be ranked higher in user interface experience level versus another user who is listed as a salesperson in their profile. Such a profile could be the UI profile in user UI profile store 146 or their job title such as in HR component 126. Another example is how often a user uses the "undo" button to fix an error they made using the program. This user may be grouped as a "beginner" user.

Another example is that if a user is in a certain geographic location they may be set at a higher user experience level based on the metrics for others in that geographic area. A similar example can be applied to certain employers, certain college degrees, certain training courses listed in a user profile or resume, and the like. Say, for example, that while a user may be new to a certain software application or user interface, if their employer has had that software for a long period of time, the user may be grouped into a higher experience level as the user will likely be around people and training materials to get them up to speed faster on the software application and/or user interface.

In some embodiments, the user can see the factors that led to a certain user experience determination and outputted UI. And in some embodiments the user is allowed to change these factors or settings so as to communicate to the system their exact preferences or to edit potentially erroneous data in the system.

In some embodiments, the user can select which parts of a software application (e.g. which menus, workflows, or processes) will include adaptive UIs and which will not have adaptive UI. For example, if a user uses a software application the same way every time and it is highly optimized, they may turn off or disable the adaptive functionality for that software application. And in other examples with complex software and complex needs, the user may always leave such an adaptive UI on so as to have the most efficient user of the software application. In some embodiments, the user can "pin" certain UI elements they like to be static while the rest of the user interface adapts according to the UI adaptive component 148. In some embodiments, the user has an on-screen option of adapting the user interface they can interact with, which will generate the adapted user interface at that time.

At step 206, the user experience system may, but is not always required to, automate specific tasks. Tasks are a series of buttons or UI interactions that achieve a result. Depending on if a user has been selected as a beginner or advanced user, the system then automates certain tasks. For example, a beginner may have an image reconstruction task automated with standard options and a single button shown, while an advanced user would not have it automated and have more options of how the image reconstruction should occur that they can select and personally direct the task. Step 206 may be generalized to beginner and advanced users (or however step 204 groups experience levels), while step 218 may be personalized to the specific user based on their interactions with the system in the present session.

At step 208, a user action occurs. User IO 102 receives an input to perform some action directed towards the software application. User IO 102 transmits the inputted user action to user experience system 104.

At step 220, user experience system 104, through input tracking component 140 in an embodiment, records the user action. This input is tracked by input tracking component

140. Input tracking component 140 adds the action to a buffer, database, or vector of current and previous user actions in the current session. Further, the algorithm, user interface, or program state may also be saved in a related buffer, database, or vector.

In some embodiments where the user interface is web-based on html standards, an application programming interface ("API") can use http calls and/or Javascript logic to track the user input and actions. For example, a user identifier can be generated. A user identifier can be unique and/or anonymized in some embodiments. A script or module can be programmed to log user actions for step 220 and to associate those actions with the particular user's identifier.

At step 222, user experience system 104, through user experience learning component 142 in an embodiment, updates the learning training base. The learning training base includes data, models, and analysis to empower the predictive features of step 210, at least. FIG. 5 shows an example of updating a learning training base.

At step 224, user experience system 104, through user experience learning component 142 and/or user experience determination component 144 in various embodiments, performs grouping and pattern recognition based on the training base. Pattern recognition includes understanding the user's working habits while using the user interface. Grouping includes applying certain input patterns into groups of similar patterns to great broader understandings, such as discussed regarding FIG. 7. Step 222 and 224, separately or in combination, may utilize computer learning (which can include machine learning, deep learning, and/or artificial intelligence modules, models, and/or algorithms).

At step 210, user experience system 104, through UI adaptive component 148 in an embodiment, predicts the next user action. This influences what the next adapted user interface should be output. This may be just changing a single button or icon to the one most likely to be needed next or can be a full re-arrangement of the user interface. In some embodiments, the system may also predict multiple next user actions and then rank them based on highest probability score. This can allow for quick adjustment in cases where the system is early in the process of learning the working habits of a newer user. More details on prediction are discussed regarding FIG. 5 and herein throughout.

At step 212, user experience system 104, through UI output component 150, outputs an adapted UI. This can take many forms, as discussed herein throughout. Three example ways to adapt the user interface are in UI hinting step 214, dynamic shortcuts step 216, and automating specific tasks step 218. Additional examples include the adapting of buttons, toolbars, layouts, images, dynamic shortcut toolbars, multiple-monitor layouts, multiple paradigm layouts, and switching paradigm layouts.

At step 214, UI output component 150, depending on the circumstances, can provide UI hinting. User interface hinting is the dynamic providing of hints to help the user navigate or otherwise use the UI. Such hints can be tailored to the user based on user experience level as well as various aspects of their user profile.

Figure 14:
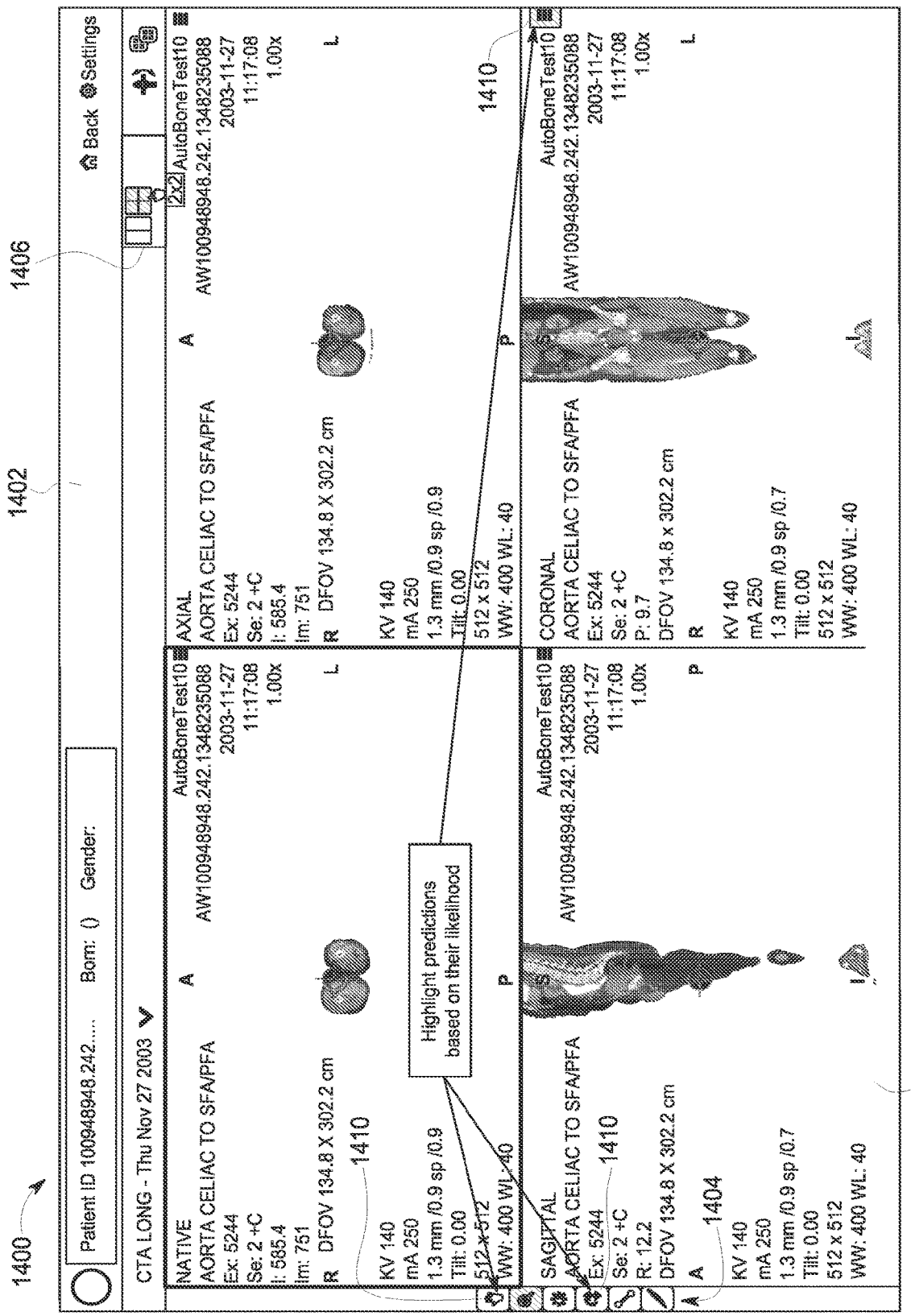
FIG. 14 shows an adaptive user interface with predictive icons, according to an embodiment.

For example, FIG. 14 shows UI hinting of buttons to show the user where the buttons are located that are the most likely buttons the user may look for next. This is done, in an embodiment, by stressing the outline of the buttons through emphasis, bold, colors, rippling edges, changing shapes, vibration of the button, or other methods. Thus, FIG. 14 shows an adaptive user interface with predictive icons that have UI hinting, according to an embodiment. User interface 1400 that has been adapted to show UI hinting in the form of highlighted buttons 1410. Highlighted buttons 1410 are stressed as having a bold outline in this example. The highlighting is also dynamic, meaning that the level of boldness in the outline can be based on how likely the button is predicated as the next button. All three buttons could be bolded, but one more strongly than the other two if it is more highly predicted as the next action, according to an embodiment. This is shown on user screen 1402 with left toolbar 1404, top toolbar 1406, and image displays 1408.

Figure 15:
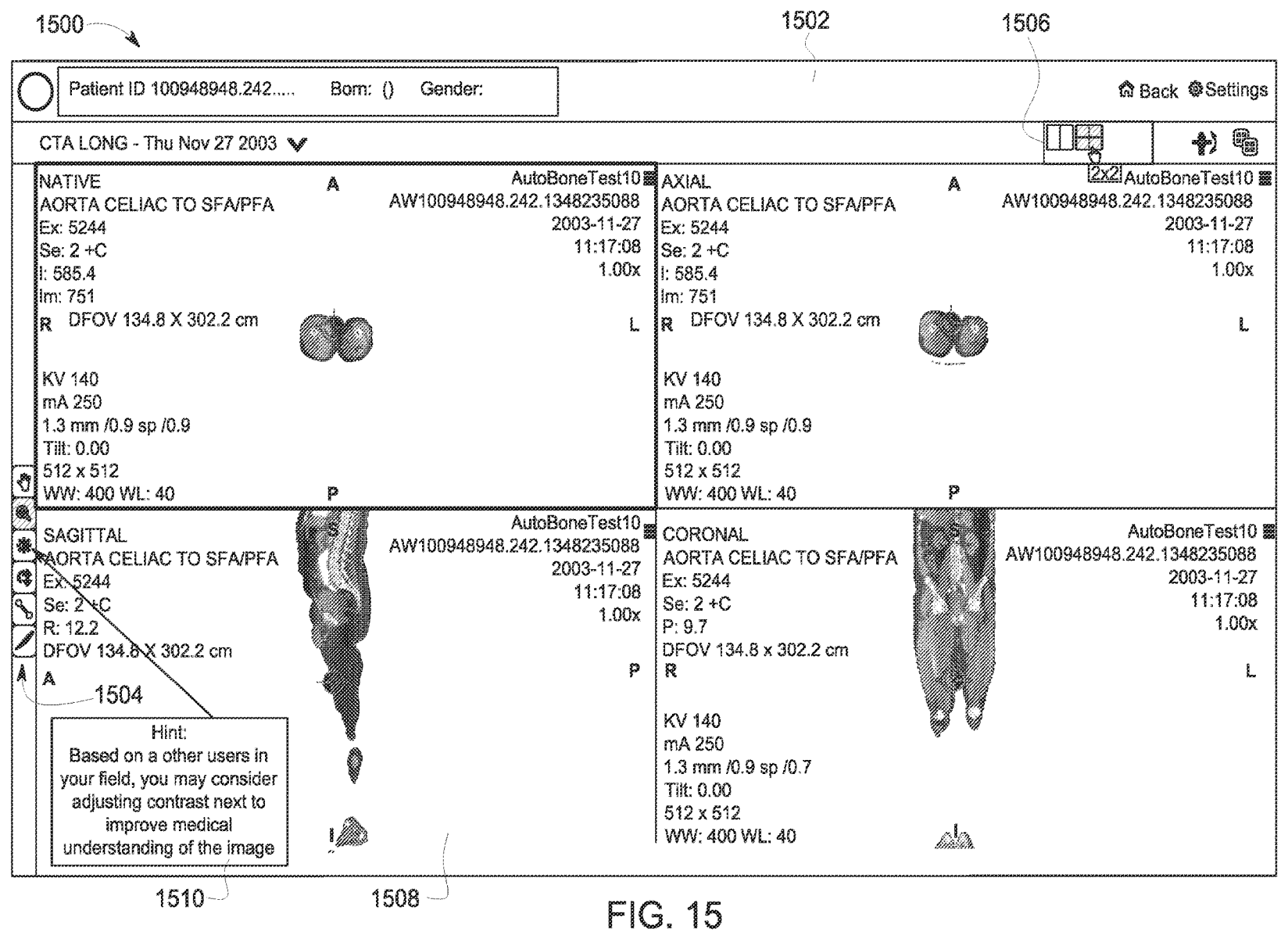

In another example, FIG. 15 shows UI hinting in the form of a box providing a textual hint to the user, providing helpful information on how the user may choose to use the software. User interface 1500 has been adapted to show hint box 1510 in this example. Hint box 1510 informs the user that "Based on other users in your field, you may consider adjusting contrast next to improve the medical understanding of the image." Such hint boxes are ways that the system can help educate beginner users and allow them to understand the software better. Such hint boxes might not be shown to advanced users or the text in the hint box would be to a more advanced technique of using the software. And the hint box may include a video or audio of the technique being taught or explained. Thus, the determination of user experience level for adapting the user interface also has effects on the UI hinting in examples like the one shown in FIG. 15. This is shown on user screen 1502 with left toolbar 1504, top toolbar 1506, and image displays 1508.

At step 216, UI output component 150, depending on the circumstances, provides dynamic shortcuts. Dynamic shortcuts are presenting dynamic toolbars of buttons such that the adapted user interface can short cut to the buttons most likely to be used next after prediction step 210. This will be discussed further with reference to FIG. 12 and FIG. 13.

Figure 12:
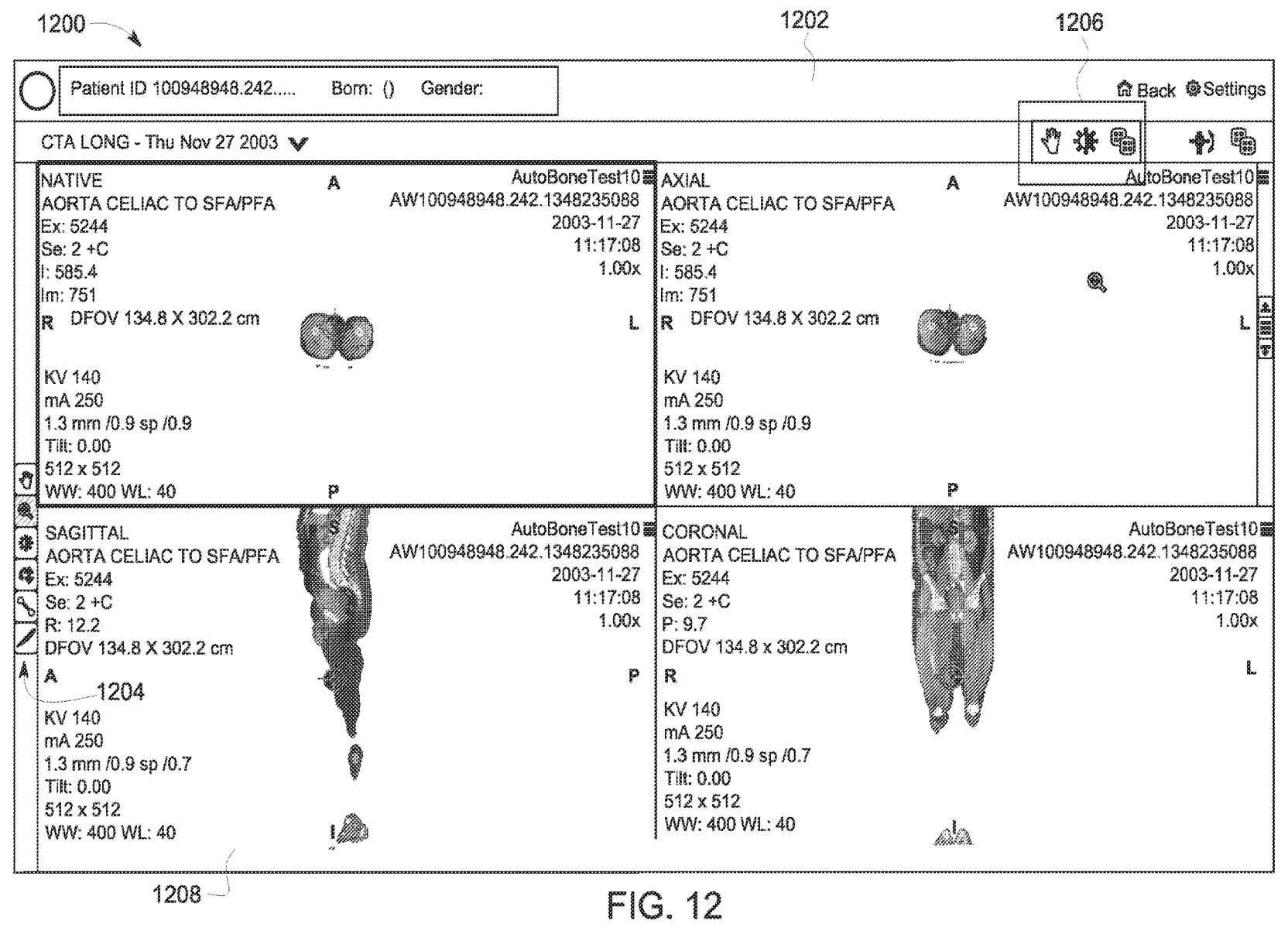
Figure 13:
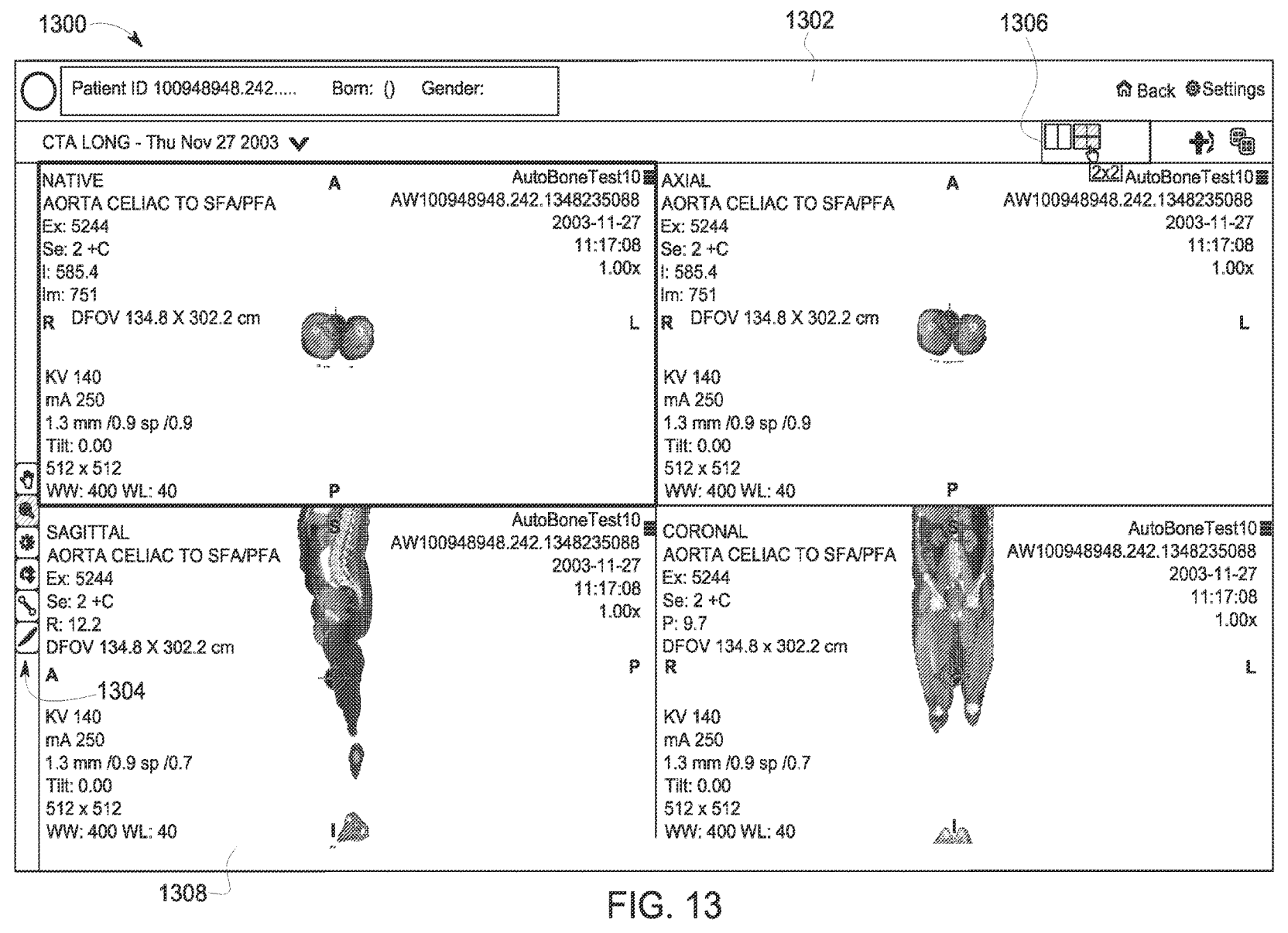

FIG. 12 shows an adaptive user interface, according to an embodiment. User interface 1200 includes user screen 1202 with left toolbar 1204, top toolbar 1206, and image displays 1208. Top toolbar 1206 is highlighted with a rectangular box for the purposes of this example. Three buttons fit in in top toolbar 1206 and it shows the likely next buttons the user will want after clicking on the magnifying glass button (with diagonal lines in the drawing) in left toolbar 1204. The user proceeds to click the right most button in top toolbar 1206 and user experience system 104 adapts and outputs the user interface to show FIG. 13. FIG. 13 shows another adaptive user interface, according to an embodiment. User interface 1300 includes user screen 1302 with left toolbar 1304, top toolbar 1306, and image displays 1308. Top toolbar has now been adapted to show the most likely buttons that the system has predicted in step 210 based on the user selection on user interface 1200. Thus, the system dynamically shortcuts to the most likely buttons the user may need. The user can still find all the options for their activity within the overall menuing structure, but step 216 is meant to help the user by simplifying the user interface for the majority of uses of the software.

At step 218, user experience system 104 can automate specific tasks. Certain tasks the system may identify as not needing direct engagement from the user. Certain users may perform the same task 100 times a day (such as a medical workflow for retrieving and enhancing a patient image). The system can, based on the training base developed in 222, know that the particular user may not need to click multiple buttons to get to the end of their task and may automatically automate such tasks. This is especially the case when the actions are easily noticed by the user and can be easily reversed if needed. Other examples and details around automating of specific tasks will be discussed with reference to FIGS. 7-9.

Additional examples of outputting adapted UI in step 212 include helping a beginner user in various ways. A contextual menu based on what more advanced users have done can be provided and be based on the previous clicks/interactions of the beginner user. Further, the dynamic menuing as contemplated herein can help a beginner, or less advanced user, discover features in the software at the right moment. This can save organizations time and money on training users on the software.

Figure 3:
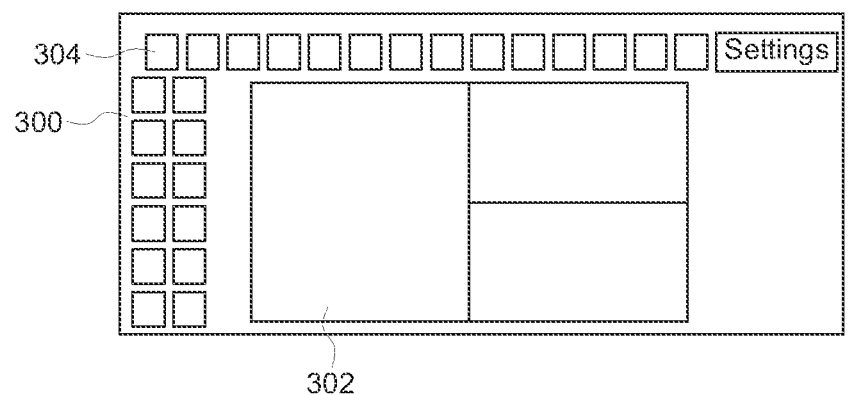
FIG. 3 shows a user interface that may presented to a more experienced user, according to an embodiment.

FIG. 3 shows a user interface that may presented to a more experienced user, according to an embodiment. Generally, more experienced users have learned about what various buttons, menus, and imaging layouts do when interacted with. These advanced users have learned the details of working with the program and prefer to have all of their options available to them. The user interface may still be adapted to show features they are most likely to need or want based on their working habits, history, profile, and other factors, but the UI is likely to include more options and features on the outputted UI. Thus FIG. 3 shows user interface 300 with UI buttons 304 and UI imaging layouts 302.

One example user interface would be for medical images to be shown based on CT, PET, MR or other medical imaging exams. The related buttons would be for reviewing related images, adjusting the images, and other analysis options. Another example user interface would be a piece of digital artwork being developed by the user. This can be displayed while the buttons would allow for creation and editing tools. Many types of user interfaces exist across various platforms and technologies. These examples are not meant to be limiting to any certain user interface type.

Figure 4:
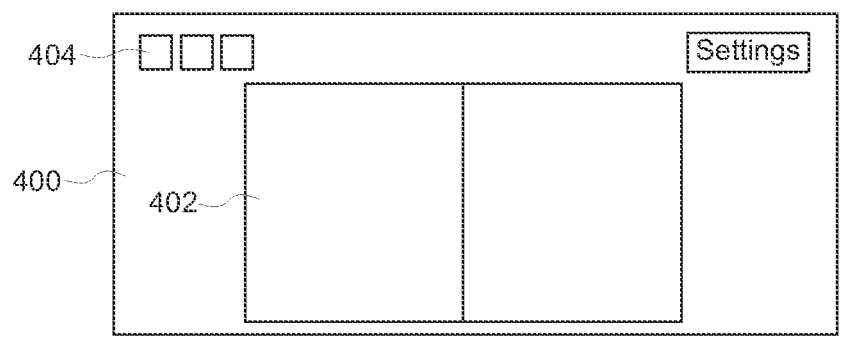
FIG. 4 shows a user interface that may be presented to a less experienced user, according to an embodiment.

FIG. 4 shows a user interface that may be presented to a less experienced user, according to an embodiment. A less experienced user may prefer a simplified version of a user interface with only the images and options that they are most likely to need next. A less experienced user may not care to know the advanced features of a software application and may be using the application a few times to complete a straight forward task. Thus, the it is sometimes valuable to provide a simpler adapted user interface in some scenarios. Advanced features are generally still available to the simplified user interface of FIG. 4, but are likely found in a sub-menu and not directly on the screen as compared with FIG. 3. Thus, the user interface for an experienced user (FIG. 3) adapts and outputs a user interface with more buttons than the user interface for the less experienced, or beginner, user (FIG. 4). FIG. 4 shows user interface 400 with UI buttons 404 and UI imaging layouts 402.

In an embodiment, the user experience system can determine how many buttons 304 and buttons 404 to display based on the experience level for the user. One way to determine the user experience level is based on the number of sessions that particular user has had with the software application or the software suite (e.g. if the software suite has a similar UI and feature set, a user's experience with one software application in the software suite may help train them for when they use another software application within the suite). In an example, the system could display an average of: four buttons if a user has had less than 20 sessions using the software application, eight buttons if a user has between 20 and 40 sessions using the software application, and twelve buttons if a user has more than 40 sessions using the software application.

In an embodiment, the user experience system can provide an adapted user interface for beginner users such as FIG. 4 and then adapt for experienced users such as in FIG. 3. The beginner user interface is generally simpler. The beginner user interface can be used for educational and training purposes to help a user improve at their utilization of the software application in a helpful and nonintrusive way. Hinting and automation can help, as discussed above. An experienced user may be faster at getting the results they are hoping to achieve, such as a faster diagnosis of a radiology image. Their user interface may be more optimized for the particular user and provide them the tools and advanced features they use the most.

In predicting the next action for beginner users, the user experience system may not have a detailed history for that particular user so may use patterns and groupings based on other users who have done similar tasks in the past. In predicting the next action for advanced users, the user experience system may provide it prediction more on the history of the particular user over the patterns and groupings of other users.

In some circumstances, though, the advanced user interface can be even more simple than a beginner user interface. When a user is considered advanced because they have used a software application hundreds of times but only use it for completing one function, or one task comprised of multiple functions that have been automated as discussed below, the user experience system may present a very simple user interface of only one button and one imaging window, for example.

FIG. 5 shows systems and methods for tracking user input, according to an embodiment. FIG. 5 shows an example representation of how the user experience learning component 142 might take tracked user input (V values) from input tracking component 140 and provide algorithmic analysis to produce predictions and adaptive output recommendations (T values) for the UI adaptive component 148. The algorithm in FIG. 5 would generally be running continuously during the usage of the related UI.

In an embodiment, FIG. 5 provides a next action predictor, such as in step 210. For a prediction, the algorithm takes as input the last number of user actions a produce results of the most probable user next actions. The algorithm may be an on-line algorithm, meaning that it learns on the fly from the user actions and improves its predictions at each action state. The algorithm can be tuned to react faster on paths that are seldom used. The algorithm can be tweaked to get the best prediction based on a previous analysis done on field users of a complex UI.

V values represent user actions and inputs. The tree of V values is built as the user successively interacts with the software application and user IO 102. For example, V(0,2) may indicate the user has clicked the "zoom" button while V(0,3) may indicate the user has clicked "change layout" button. Both V(0,2) and V(0,3) are below V(n−1,1) which may have been the previously selected "view options" menu. These are examples meant to convey possibilities of the representation in FIG. 5.

V values are formed as vectors, such as V_input=[V_0 V_1 . . . V_n]. V(0) can be the oldest action in the input vector with V(n) being the newest. The system provides the last i user actions to the algorithm and get the probabilities associated to the next possible actions. In other terms, with x∈Buttons, i∈N, user experience learning component estimates $P(X(n)| X (n-1), X(n-2), \ldots , X(n-i))$. The system may use a Bayesian algorithm based on Markov chains, in an embodiment.

T values represent predictions or adaptive output recommendations. The goal is to anticipate what may be most helpful to a user and provide such UI features in the adapted UI. If a user clicks V(0,2) and was indicating "zoom" in the example above, the system may output that the user likely would be interested in T(0), T(1), or T(2), which may relate to 50% zoom, 100% zoom, and 150% zoom, respectively. All three buttons/options for such zooms could then be presented on the adapted user interface. If a user clicks V(0,3) and was indicating "change layout" in the example above, the user experience system may know the user's intention from previous uses and provide the T(2) option to resize the layout to 100% zoom. Thus, each time the user clicks a button or engages with the UI, the system records the action, updates the training base and predicts the next button, such as with, but not limited to, the algorithm of FIG. 5.

The user experience learning component 142 can provide probabilities for next action or button based on the previous n actions. These can be generated by comparing the current vector tree with previous action vector trees and those of others to validate the accuracy and probability of the prediction being generated in step 210. In some embodiments, the system may prune the vector tree from time to time. Such pruning can prevent the algorithm from overfitting the data and can produce better results.

Some embodiments may not include a vector tree structure such as shown in FIG. 5 when performing the prediction of the next probable action. Other prediction algorithms may be incorporated using neural networks, support vector machines, and other prediction tools.

FIG. 7 shows a neural network for grouping, rating, and adaptive output type, according to an embodiment. FIG. 7 shows neural network 700 with neural nodes for dynamic computer learning using factors 702, groupings 704, and ratings 706 to produce adaptive UI output type 708. The first node layer in the neural network are the initial data factors that may influence the type of outputted adapted user interface. The second node layer in the neural network are initial groupings that try to derive characteristics about the user and/or situation. The third node layer provides initial ratings about the user and/or situation. The fourth node layer is a decision as to what the adaptive UI output type should be. Such a system can be used in the user experience learning component to evaluate more than typical factors that may affect the usefulness of a certain UI output type. The nodes and node connections in FIG. 7 are exemplary and not meant to be limiting.

First input factors in factor 702 layer relate to the current usage of the user interface, as referenced above. The system registers buttons clicked, screens interacted (mouse or touch interactions with the screens in an embodiment), and number of monitors of interaction for the user. For example, if the user uses both their smartphone to use a software application and then their desktop computer to use another instance of the software application in the same session this may indicate the types of user and UI desired. For another example, if the user has the option to use two side-by-side screens in a desktop environment but uses the right monitor 90% of the time in the current session, the user may prefer future adapted user interface outputs to focus more of the interaction on the right monitor.

Second input factors relate to historical usage factors. The system has registered how many times the user has used certain help menus and for what types of issues, what tasks (series of actions) that user has performed, and past user outputted user interfaces have been presented to that user. In addition, the system can record what explicit feedback it has received. The system can ask the user what their UI preferences are and if certain adapted UIs have been helpful. This feedback can be put under historical usage factors when trying to understand how to best learn what the best adapted UI is to output in the current session.

Third input factors relate to a user profile. This can include the user's job title, the user's clinical specialty if the user is a healthcare user, the user's software access license or permissions (such as giving access to certain features in the software), the user's specific location, and the user's geographic region. Regarding user's job title or clinical specialty, the system can learn that certain users based on role may need access to certain features in the user interface to surface or hide. Further, certain users based on their training and job experience (saved in their user profile) may have more tech-savviness. The user profile may specifically list that the user has taking levels one and two of training for a specific software application. These users may more quickly be presented advanced UI outputs than those that have not had the training logged in their user profile. Regarding user's specific location, the system may know that the user wants more advanced features in their office user IO and would like less advanced features when moving in a mobile context. Regarding user's geographic region, the laws in certain regions may only allow certain features in a user interface or computer program. This may relate to certain medical features, encryption options, and financial oversight options based on government rules or laws.

Fourth input factors relate are additional characteristics. These can be technology factors such as what technology systems are working at a given time, web browser used, screen size, software plug-ins available, codecs available, interne speeds, network speeds, the device input paradigm, and processing power (locally and/or remote). Another type of additional characteristic is the situation of the user, which can be a medical situation. For example, if there is an emergency situation and the user experience system can access the electronic medical records from record stores 130, the user experience system may determine that the current output should not include educational tips and help (which may slow down the user) but instead try to give the user the fastest way to get to the desired result. If the medical situation is related to stroke, the system can deprecate UI outputs that have little to do with detecting and treating stroke to provide a very helpful UI for the exact situation that the user is trying to influence. Another type of additional characteristic is patient (or client) scheduling. If a medical professional has 20 minutes before their next patient as shown in the patient scheduling system, the system may output a certain education UI output version to allow the user to improve their UI usage versus two minutes before the next patient where the user may be given a more straight-forward UI to complete a set task.

Grouping 704 layer takes in factors about the user and/or situation and assesses the strength of the factors to group the information as related to similar situations and/or users. For example, if the user has used the software application less than five times and appears focused on only performing one type of task based on the buttons and menus they are accessing, the node for single time user single task may have a higher decision probability output. For example, if the user is using the help menu a lot or is asking a friend how to complete a task (as can be detected via audio input or via the instant messages being sent on the computer), the node for user new to task may have a higher decision probability output. For example, if the user has a title of "Information Technology Manager" and has used programs within the software suite over 100 times, the node for tech savvy in general may have a higher decision probability output. For example, if a user has had a specific type of user interface output when using the software application many times in the past because they only perform one type of task and the user has provided positive feedback and the user always logs into the software application on the same device, the node for long time user typical task may have a higher decision probability output. For example, if there is an emergency situation and a new user is trying to complete a task they have not done before and are not likely to do again, the node for non-typical task/situation may have a higher decision probability output.

Rating 706 layer takes in grouping outputs and provides ratings for the user's experience level, best practice quality of the user's interactions, and how much a user is needed to be involved in certain tasks. A first node in rating 706 layer makes a rating as to the user experience level for a single task and/or software application. A second node in rating 706 layer makes a rating as to the user experience level for a multiple task or software application situation. A third node in rating 706 layer makes a rating as to whether the user actions are associated with best practices of other users. A fourth node in rating 706 layer makes a rating as to the speed that the user may need to complete the task given the situation and other factors. A fifth node in rating 706 layer makes a rating as to whether a user is needed to perform a task, such as routine task. In some instances, automating tasks can help reduce UI steps for a user, as discussed further with reference to FIG. 8 and FIG. 9.

Adaptive UI output 708 layer decides as to how to adapt the user interface based on the factors, groupings, and ratings within the system. This can be in the form of a simple tool bar, advanced tool bar, simple layout, advanced layout, hints, tooltips, automation suggestions, no change, change paradigm, and many others as discussed throughout. For an example, if the user has a lower level of experience with the software application but is exactly following the best practice to complete a specific task, the system may give a simple tool bar and a simple layout to help the user perform the exact task. For an example, if the user experience level is low and user speed is needed, the user experience system may output hints in the form of arrows to exactly the buttons or steps needed to complete the task. For an example, if the user experience level is high and user speed is not needed, the system may provide more buttons in the tool bar to help give the user time to explore the options they may want without hiding the options in sub-menus.

In FIG. 7, lines with dots are shown as ones with higher weighted connections within nodes. Both the strength of nodes and the weight of connections help the user experience system make decisions. The input nodes with a higher weighted connection are given higher influence on the output of the recipient node. For example, the medical situation factor node has a higher influence on the non-typical situation node more than the user location node because it defines the situation of the user.

FIG. 7 is shown with connections going only between a node layer and the adjacent node layer. In alternate embodiments, connections may go between non-adjacent node layers. For example, factor 702 layer may have some of its nodes connecting to rating 706 layer. In an embodiment, the various node layers may be performed by a single component, such as user experience learning component 142 or CPU/GPU 154. In an alternate embodiment, the various node layers may be performed by different node layers, such that factor 702 layer is performed by input tracking component 140, grouping 704 layer is performed by user experience learning component 142, rating 706 layer is performed by user experience determination component 144, and adaptive output type 708 layer is performed by UI adaptive component 148. As can be seen, such a neural network (or related deep learning or artificial intelligence system) can be used to help take in the variety of factors and help decide what types of adaptive user interfaces should be output.

Figure 8:
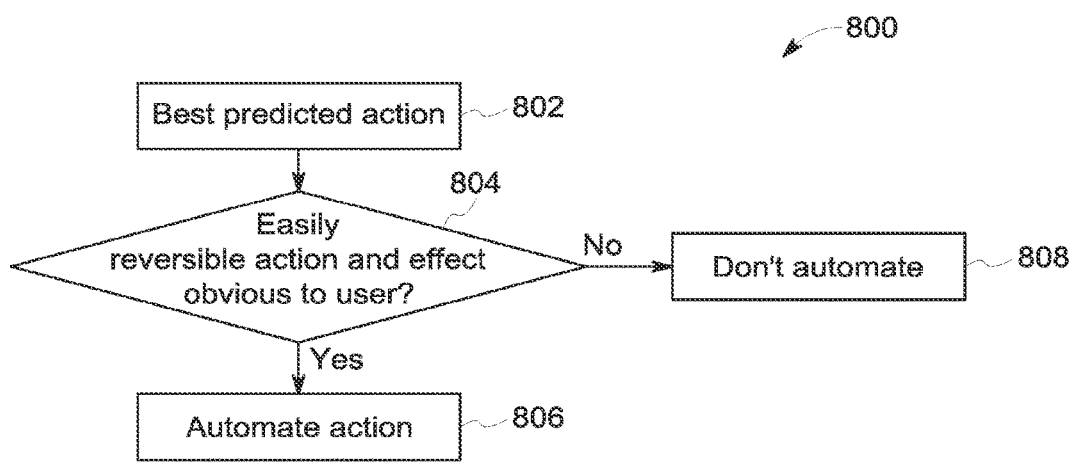
FIG. 8 shows a process for automating actions in a user experience system, according to an embodiment.

FIG. 8 shows a process 800 for automating actions in a user experience system, according to an embodiment. Such a process may be implemented in action automation component in an embodiment. Automating certain actions can remove user steps and save time. This can be critical in many situations where time is of the essence, for example in emergency medical situations or when trying to recover a computer system from an outage.

In step 802, user experience system 104 determines the best predicted action. This is the likely next action that the user will want to take in the software application using the user interface.

In step 804, user experience system 104 determines whether the best predicted action is easily reversible and whether the effect is obvious to the user. If yes, process 800 proceeds to step 806. If no, process 800 proceeds to step 808. Some actions, such as imaging layout, are obviously noticed by the user and can be easily reversed if needed. This is especially true if the user is proficient (high level of experience) in the user interface or is knowledgeable about the "undo" command.

In step 806, user experience system 104 automates the next action. In automating the system is not presenting the action on the adapted user interface. Instead, it is performing the action for the user and then moving to the next predicted action and adapted user interface. Because of the decision in step 804, these actions are automated without risk for the software to perform an action not wanted by the user. In some embodiments, automation of multiple actions can be performed, especially in the case of a user who always performs the same steps. If there is a repetitive five action process the user always performs, step 806 can automate those five actions. The system, in some embodiments could have a pop-up window appear to describe the automation that occurred.

In step 808, user experience system 104 adapts the user interface as needed and does not automate the next predicted action. This can prevent unexpected automations and confusion for the user. Some actions are hard to notice at times, like changing the contrast in an image a bit or changing a background setting.

Figure 9:
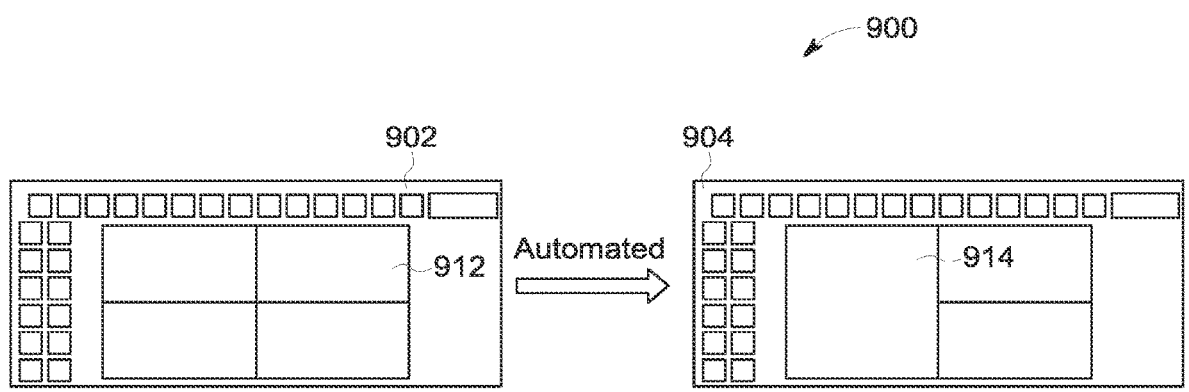
FIG. 9 shows a process flow between a user interface and an adapted version of the user interface, according to an embodiment.

FIG. 9 shows a flow between a user interface and an adapted version of the user interface, according to an embodiment. The specific example FIG. 9 is in automating the task of adjusting an image layout, such as a medical image layout. This can be considered dynamic image layout. Process 900 shows original user interface 902 and adapted user interface 904. Original user interface 902 includes original image layout 912. Adapted user interface 904 includes automated image layout 914. In the example of FIG. 9, process 800 has occurred and determined that changing the layout from a four image layout to a three image layout to with a left image in a larger form is the best predicted next action. Since the action is easily reversible and obvious to the user, the user experience system automates the change in image layout from original user interface 902 to adapted user interface 904 without user action in step 806. This can speed up the user's use of the software and provide a better user experience.

Figure 10:
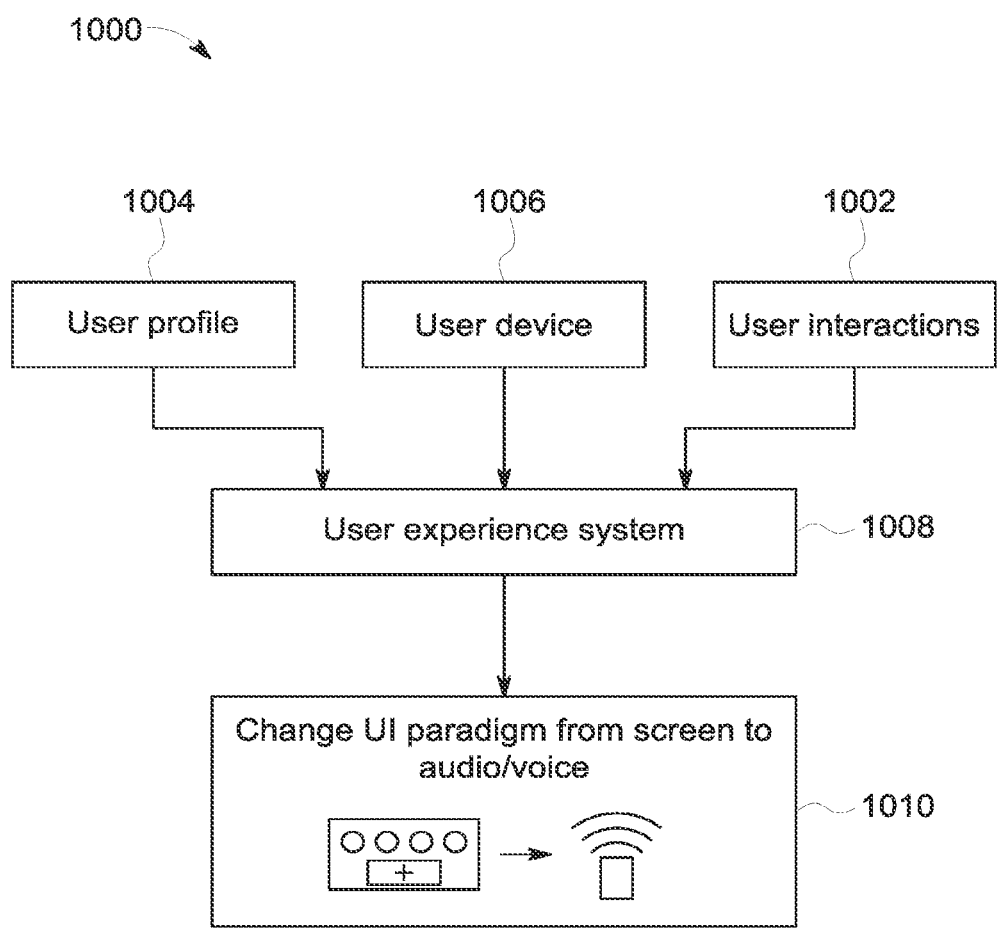
FIG. 10 shows a process for adapting a user interface paradigm, according to an embodiment.

FIG. 10 shows a process 1000 for adapting a user interface paradigm, according to an embodiment. In today's world, a user can interact with a software application in many different user interface paradigms, from touch, mouse, voice, eye movement, and so forth.

In step 1004, the user experience system 104 accesses the user profile, such as from user UI profile store 146 in an embodiment. The user profile can include that user's interactions with other user interfaces. This can include how often they use voice interfaces and digital assistants, mouse and screen user interfaces, touch user interfaces, and other types of user interfaces. For example, if the person has eight voice controlled virtual assistant speakers around their house, the system can bias towards providing a voice controlled adaptive user interface. Another example is where the system can retrieve information in the profile that the user uses their tablet device a lot more than their mouse and keyboard device. The system can adapt the user interface for tablet usage and notify the user that there is a tablet (touch controlled) version of the user interface available. This information can help provide the user experience system 104 provide the most useful adapted user interface for the user.

In step 1006, the user experience system 104 accesses user device information. This may be the device currently being used, as well as all other nearby devices, such as from user IO 102 or hardware systems 108, or user devices that may be remote, such as from user IO 102 or such as from external data sources 110. The user experience system 104 can thus know what other options are available when deciding whether to adapt the user interface to another device and/or UI paradigm.

In step 1002, the user experience system 104 assesses the user's current and previous interactions. Such interactions give an indication of the intention of the user. This can be shown with further reference to FIG. 2 and FIG. 5.

In step 1008, the user experience system 104 processes the inputs from steps 1002, 1004, and 1006 to determine the adaptive UI to output to user IO 102, which may be performed by UI adaptive component 148 in an embodiment.

In step 1010, the user experience system 104 changes the UI paradigm. In this specific example, the change is from a screen based user interface with buttons that can be touched or clicked to a voice/audio based user interface where a user would speak with and hear the user interface. Such paradigm shifts can be very helpful in many circumstances, such as when a user is going from their home into their car and can switch to the voice user interface for their software application.

Figure 11:
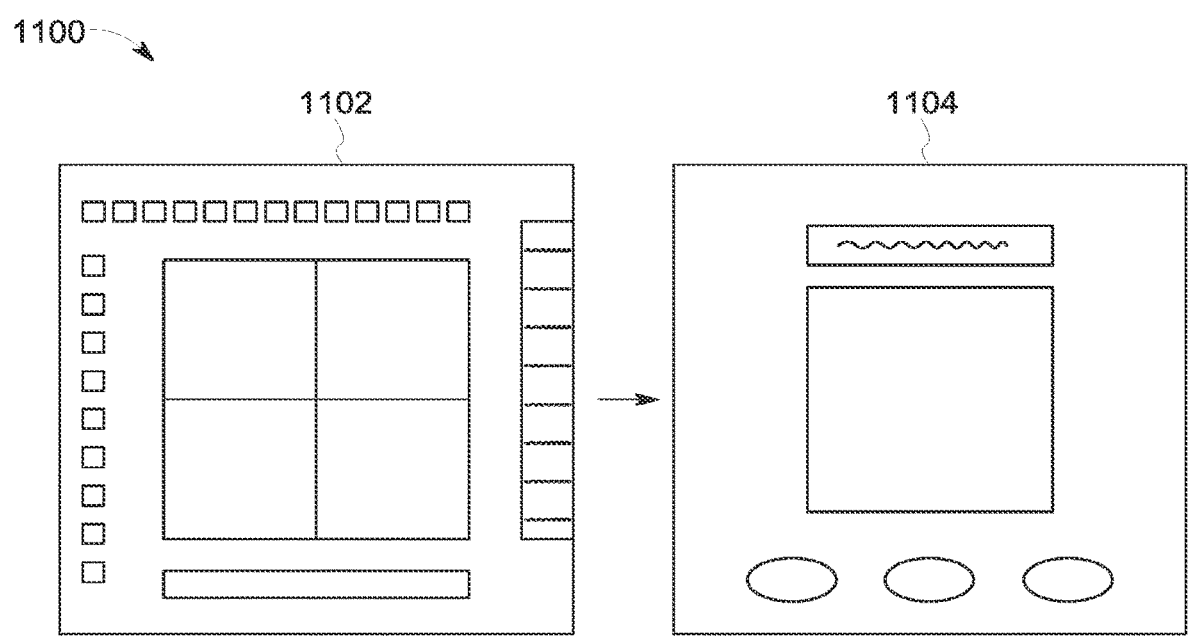
FIG. 11 shows a flow between a user interface and an adapted version of the user interface, according to an embodiment.

FIG. 11 shows a flow between a user interface and an adapted version of the user interface, according to an embodiment. In FIG. 11 shows a process 1100 for adapting an original user interface 1102 to adapted user interface 1104. Original user interface 1102 is more complex than adapted user interface 1104. Original user interface 1102 may be a desktop computer user interface. When the user wants to use their mobile device, like a tablet computer or a smartphone, the user experience system 104 can adapt the user interface to have larger buttons and less clutter, thus making it easier to be interacted with by hand and on a smaller screen. This is shown in adapted user interface 1104. Process step 1010 can provide the changing of paradigms like the one shown in FIG. 11 in an embodiment.

The systems and methods herein, in various embodiments, improves computer technology by reducing user interface load times, making more efficient usage of UI assets, minimizing CPU cycles to operate a user interface, saving system power, and can offload UI management to remote servers on the Internet.

For users of the systems and methods herein, the benefits are plentiful, both for the user of the UI and the others affected by this usage. The user of the UI can: learn to use the UI faster, minimize mouse travel, have improved workflow optimization, feel less lost and frustrated, have improved results from the UI, have user-specific optimizations of the UI, feel less physical strain (the cause of many workplace ergonomic issues), have more fun, and use the UI in more areas of their lives. For others affected by the UI usage, better uses of software applications can save lives in the healthcare field, can improve morale in software engineering field, improve manufacturing uptime in the manufacturing field, and can save money in many fields by having to pay the users of the UI less because the work is completed faster.

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

Figure 16:
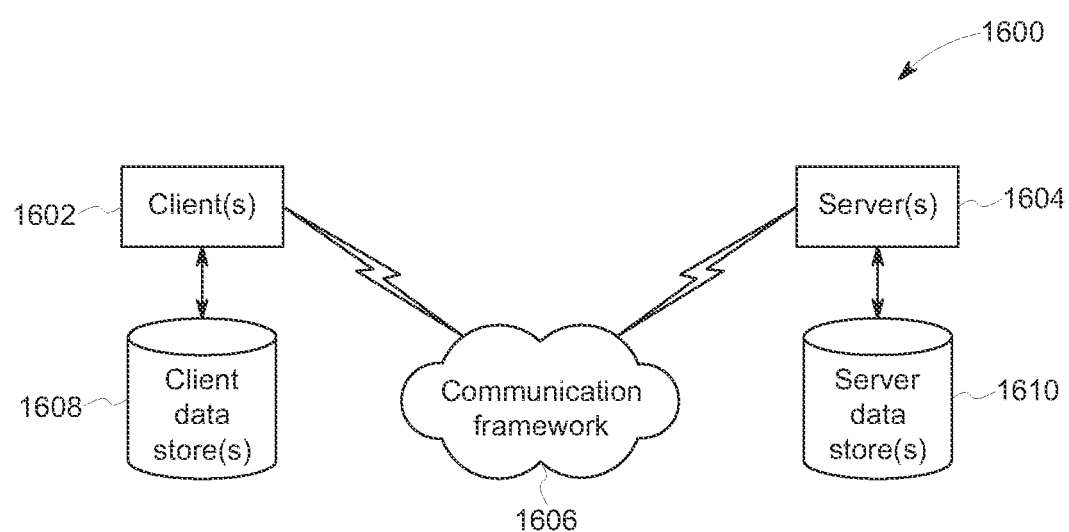
FIG. 16 shows a schematic block diagram of a sample-computing environment, according to an embodiment.

Referring to FIG. 16, there is illustrated a schematic block diagram of a computing environment 1600 in accordance with this disclosure in which the subject systems, methods and computer readable media can be deployed. The computing environment 1600 includes one or more client(s) 1602 (e.g., laptops, smart phones, PDAs, media players, computers, portable electronic devices, tablets, and the like). The client(s) 1602 can be hardware and/or software (e.g., threads, processes, computing devices). The computing environment 1600 also includes one or more server(s) 1604. The server(s) 1604 can also be hardware or hardware in combination with software (e.g., threads, processes, computing devices). The servers 1604 can house threads to perform transformations by employing aspects of this disclosure, for example. In various embodiments, one or more of the subject front end-components can be deployed as hardware and/or software at a client 1602 and one or more of the subject back-end components can be deployed as hardware and/or software at server 1604. One possible communication between a client 1602 and a server 1604 can be in the form of a data packet transmitted between two or more computer processes wherein the data packet may include video data. The data packet can include a metadata, e.g., associated contextual information, for example. The computing environment 1600 includes a communication framework 1606 (e.g., a global communication network such as the Internet, or mobile network(s)) that can be employed to facilitate communications between the client(s) 1602 and the server(s) 1604.

Communications can be facilitated via a wired (including optical fiber) and/or wireless technology. The client(s) 1602 include or are operatively connected to one or more client data store(s) 1608 that can be employed to store information local to the client(s) 1602 (e.g., associated contextual information). Similarly, the server(s) 1604 are operatively include or are operatively connected to one or more server data store(s) 1610 that can be employed to store information local to the servers 1604.

In one embodiment, a client 1602 can transfer an encoded file, in accordance with the disclosed subject matter, to server 1604. Server 1604 can store the file, decode the file, or transmit the file to another client 1602. It is to be appreciated, that a client 1702 can also transfer uncompressed file to a server 1604 and server 1604 can compress the file in accordance with the disclosed subject matter. Likewise, server 1604 can encode video information and transmit the information via communication framework 1606 to one or more clients 1602.

Figure 17:
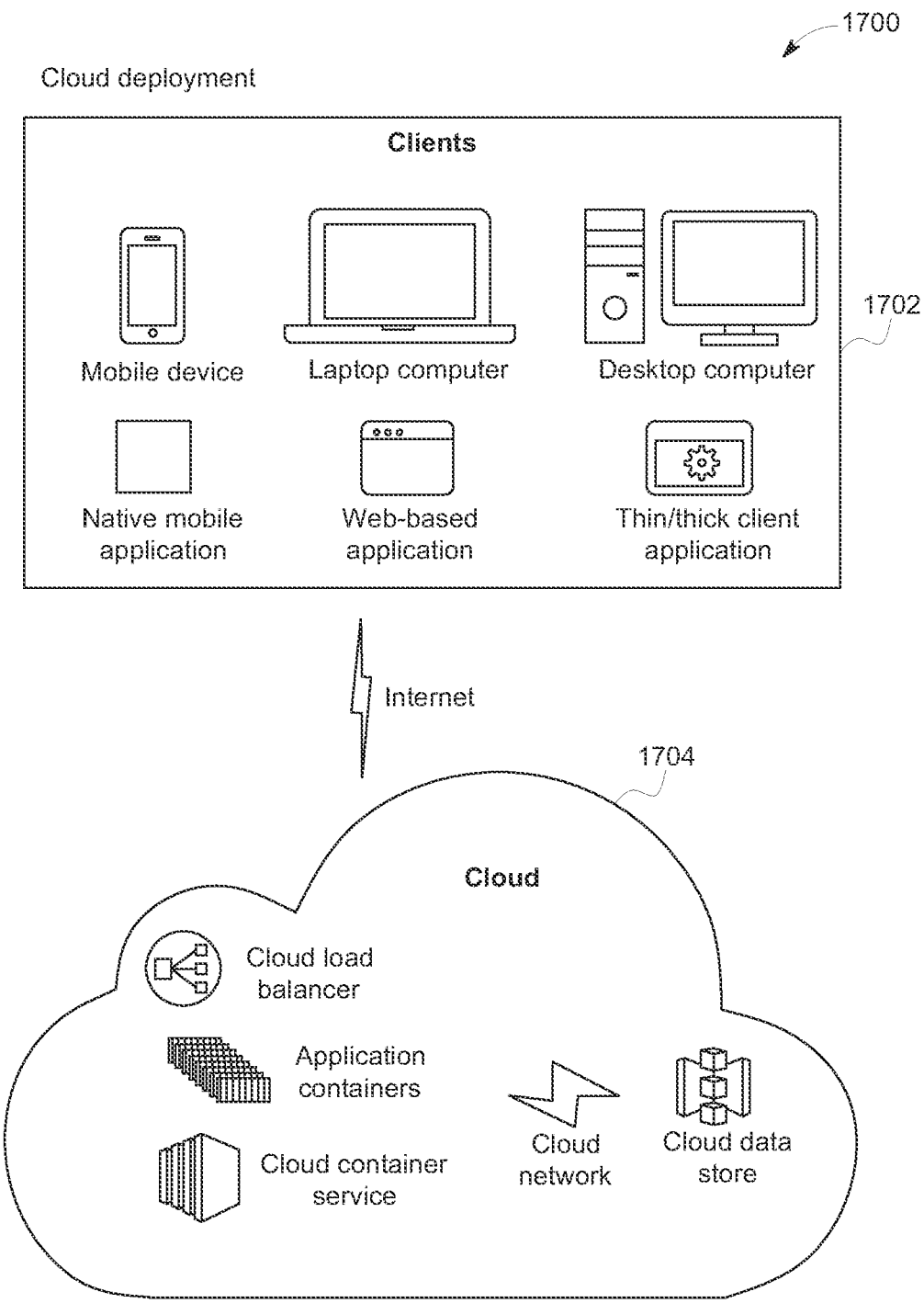
FIG. 17 shows a schematic block diagram of another sample-computing environment, according to an embodiment.

FIG. 17 illustrates a schematic block diagram of another example computing environment 1700 in accordance with this disclosure in which the subject systems, methods and computer readable media can be deployed. The computing environment 1700 includes a cloud deployment architecture consisting of one or more clients 1702 that can be communicatively coupled to a system cloud 1704 via a network (e.g., the Internet). The system cloud 1704 can include a cloud load balances, one or more application container, one or more cloud service containers, a cloud data store, and a cloud network that communicatively couples the one or more cloud components to the cloud data store. In accordance with the cloud deployment architecture, the clients 1702 can include one or more clients devices (e.g., a mobile device, a laptop computer, a desktop computer, etc.) which can include or employ a suitable application (e.g., a native mobile application, a web-based application, a thin/thick client application, etc.) to access and employ one or more features and functionalities of the subject native/reconstructed medical imaging systems deployed in the system cloud 1704. In various implementations, the one or more components of system 100 can be distributed between the clients 1702 and the system cloud 1704.

Figure 18:
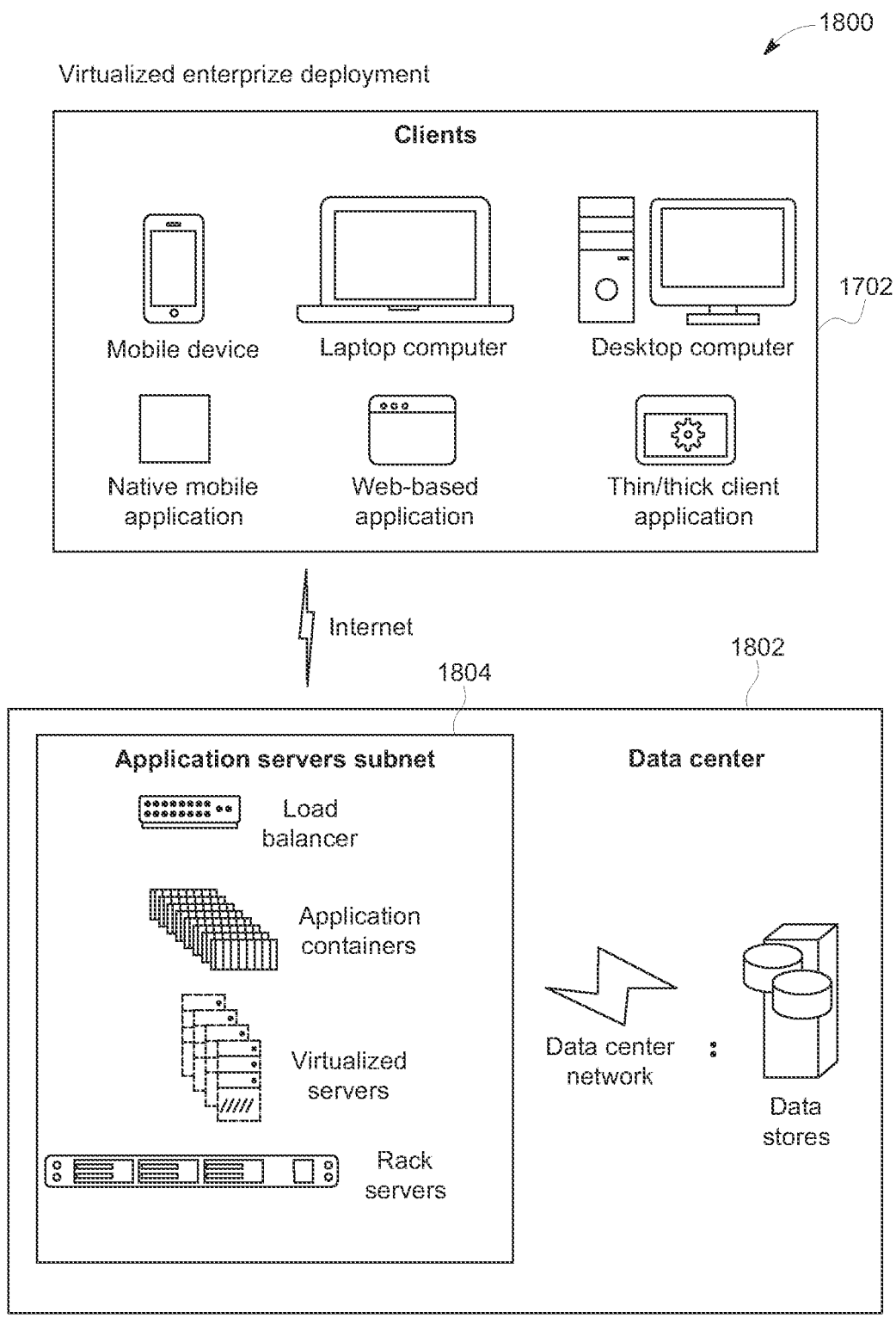
FIG. 18 shows a schematic block diagram of another sample-computing environment, according to an embodiment.

FIG. 18 illustrates a schematic block diagram of another example computing environment 1800 in accordance with this disclosure in which the subject systems (e.g., systems 100 and the like), methods and computer readable media can be deployed. The computing environment 1800 includes a virtualized enterprise deployment consisting of one or more clients 1702 that can be communicatively coupled to a remote data center 1802 via a network (e.g., the Internet). The remote data center 1802 can include an application servers subnet 1804 which can provide a load balancer, one or more application containers, one or more virtualized servers and one or more rack servers. The data center 1802 can also include one or more data stores that can be communicatively coupled to the application servers subnet 1804 via a data center network. In accordance with the virtualized enterprise deployment, the clients 1702 can include one or more clients devices (e.g., a mobile device, a laptop computer, a desktop computer, etc.) which can include or employ a suitable application (e.g., a native mobile application, a web-based application, a thin/thick client application, etc.) to access and employ one or more features and functionalities of the subject native/reconstructed medical imaging systems (e.g., system 100 and the like) deployed in the data center 1802 and application servers subnet 1804. In various implementations, the one or more components of systems 100 can be distributed between the clients 1702 and the application servers subnet 1804 and the one or more data stores can be provided remotely at the data center 1802.

Figure 19:
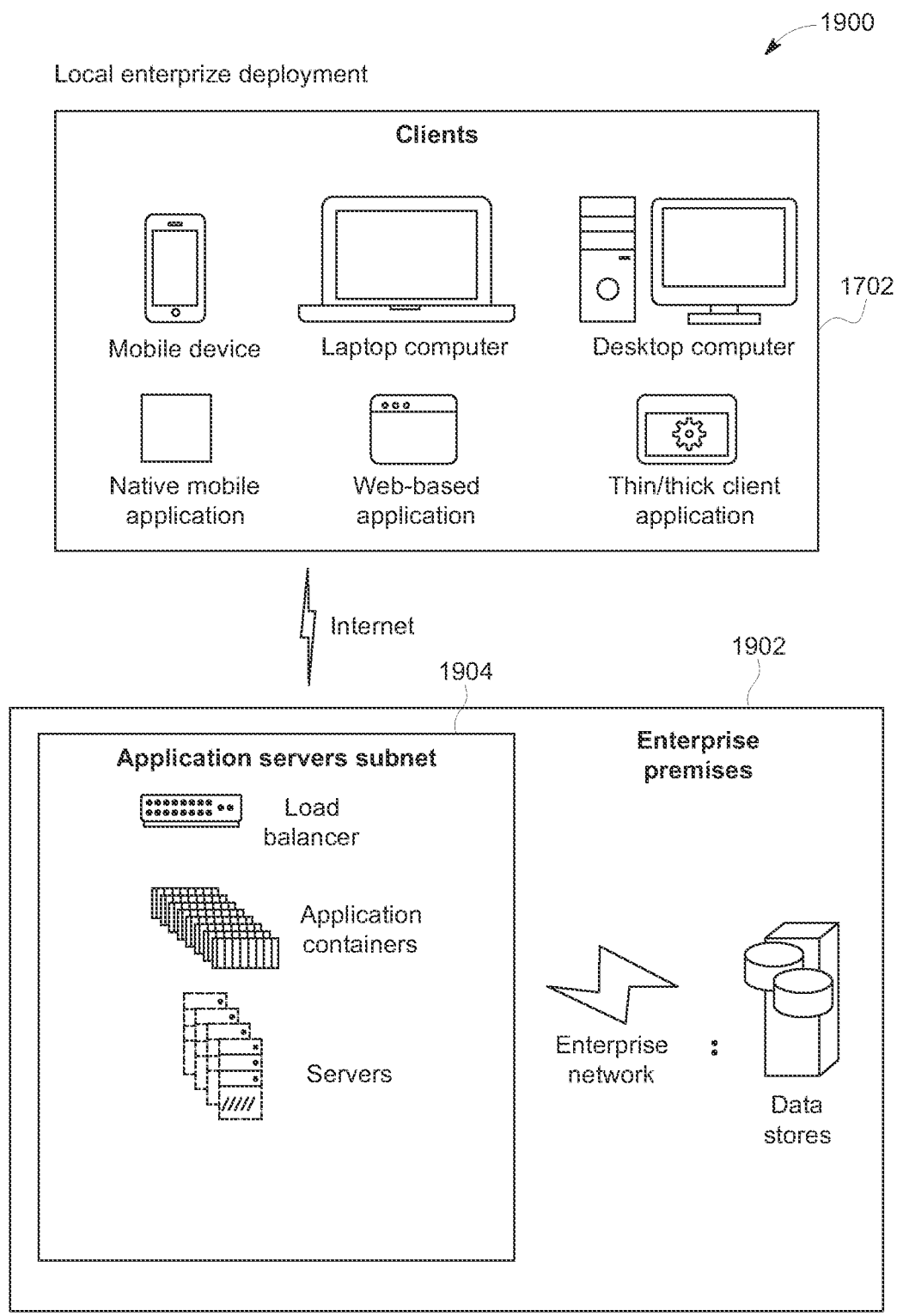
FIG. 19 shows a schematic block diagram of another sample-computing environment, according to an embodiment.

FIG. 19 illustrates a schematic block diagram of another example computing environment 1900 in accordance with this disclosure in which the subject systems (e.g., systems 100 and the like), methods and computer readable media can be deployed. The computing environment 1900 includes a local enterprise deployment consisting of one or more clients 1702 that can be communicatively coupled to an application servers subnet 1904 via a network (e.g., the Internet). In accordance with this embodiment, the application servers subnet 1904 can be provided at the enterprise premises 1902 (e.g., as opposed to a remote data center 1802). The application servers subnet 1904 can include a load balancer, one or more application containers and one or more servers. The application servers subnet 1904 can be communicatively coupled to one or more data stores provided at the enterprise premises 1902 via an enterprise network. Similar to the cloud and virtualized enterprise deployments, the clients 1702 can include one or more clients devices (e.g., a mobile device, a laptop computer, a desktop computer, etc.) which can include or employ a suitable application (e.g., a native mobile application, a web-based application, a thin/thick client application, etc.) to access and employ one or more features and functionalities of the subject native/reconstructed medical imaging systems (e.g., system 100 and the like) deployed at the enterprise premises 1902 and the application servers subnet 1904. In various implementations, the one or more components of systems 100 can be distributed between the clients 1702 and the application servers subnet 1904 and the one or more data stores can be provided at the enterprise premises 1902.

Figure 20:
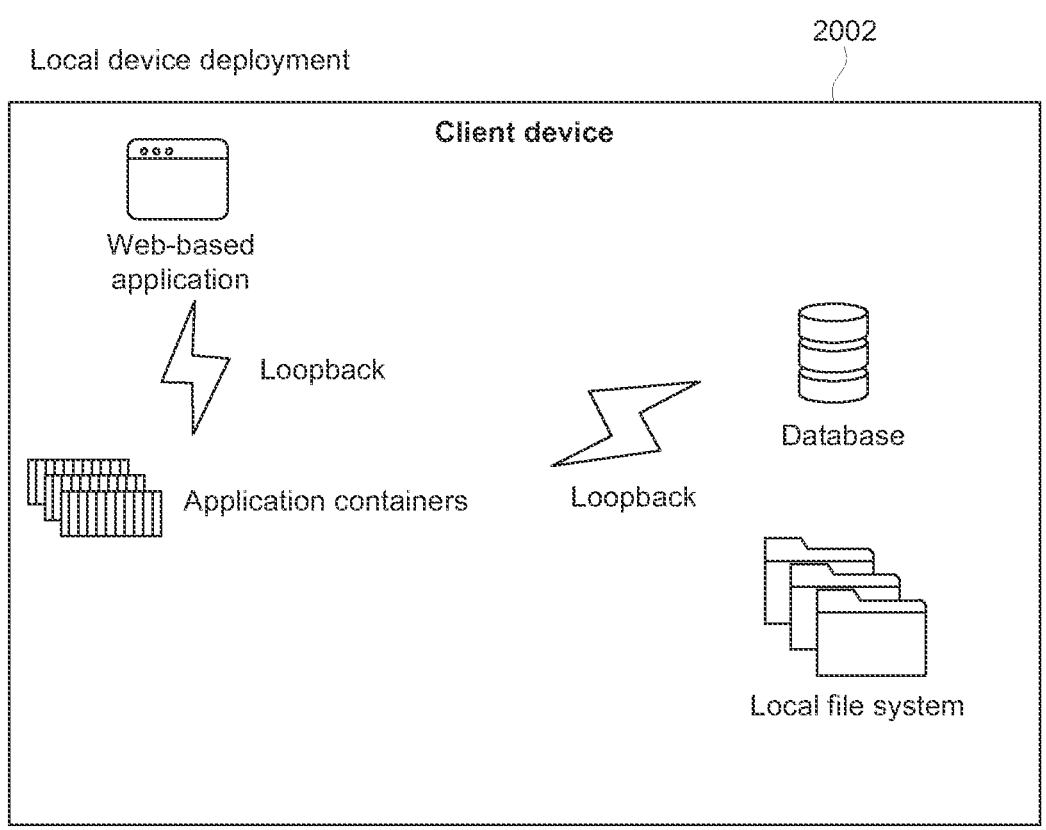
FIG. 20 shows a schematic block diagram of another sample-computing environment, according to an embodiment.

FIG. 20 illustrates a schematic block diagram of another example computing environment in accordance with this disclosure in which the subject systems, methods and computer readable media can be deployed. The computing environment includes a local device deployment in which all of the components of system 100 are provided at a single client device 2002. With this implementation, the client device 2002 can include a web-based application which can be communicatively coupled via a loopback to one or more application containers. The one or more application containers can be communicatively coupled via a loopback to one or more databases and/or one or more local file systems.

Figure 21:
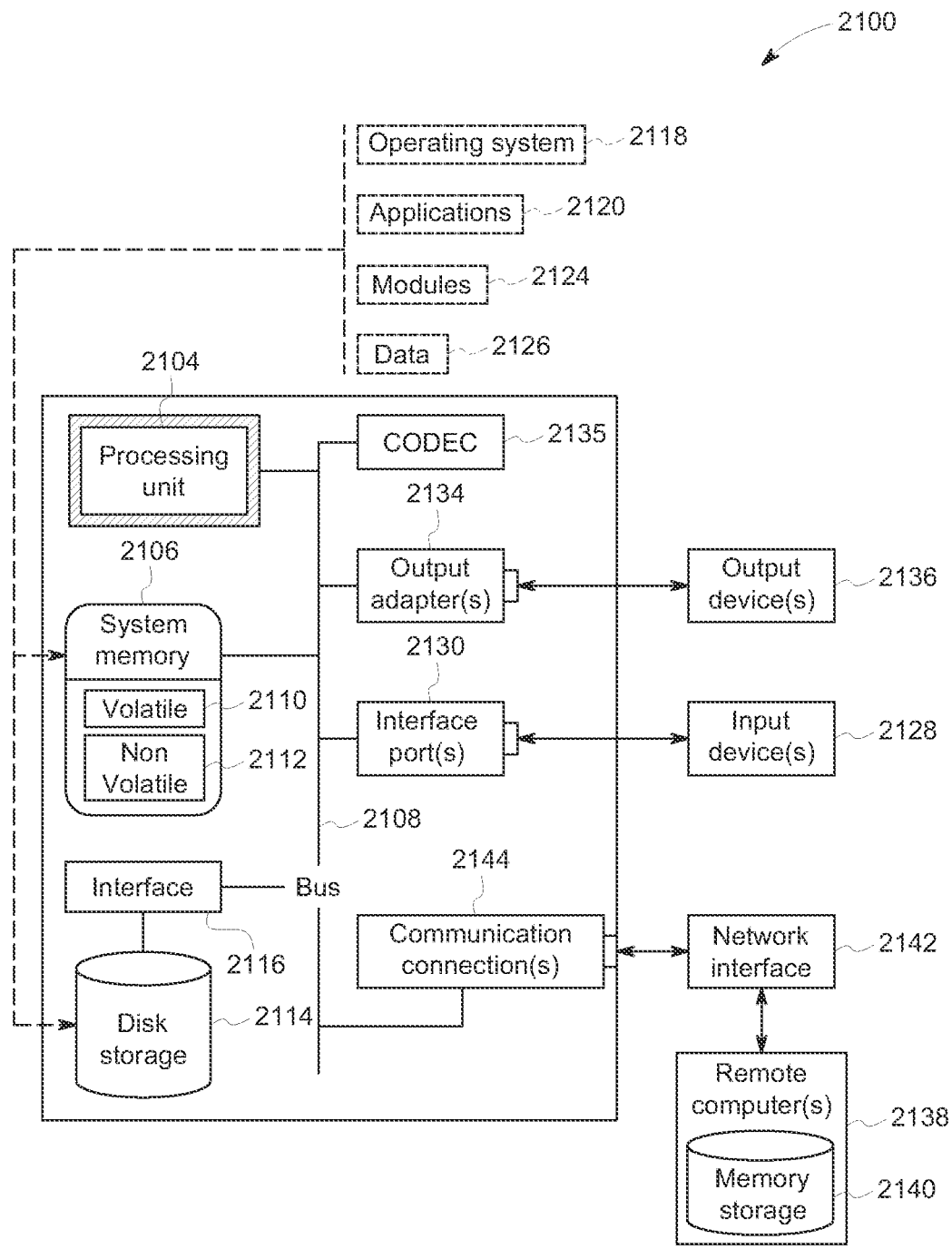
FIG. 21 shows a schematic block diagram illustrating a suitable operating environment, according to an embodiment.

With reference to FIG. 21, a suitable environment 2100 for implementing various aspects of the claimed subject matter includes a computer 2102. The computer 2102 includes a processing unit 2104, a system memory 2106, a codec 1205, and a system bus 2108. The system bus 2108 couples system components including, but not limited to, the system memory 2106 to the processing unit 2104. The processing unit 2104 can be any of various available processors. Dual microprocessors and other multiprocessor architectures also can be employed as the processing unit 2104.

The system bus 2108 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 22104), and Small Computer Systems Interface (SCSI).

The system memory 2106 includes volatile memory 2110 and non-volatile memory 2112. The basic input/output system (BIOS), containing the basic routines to transfer information between elements within the computer 2102, such as during start-up, is stored in non-volatile memory 2112. In addition, according to present innovations, codec 2105 may include at least one of an encoder or decoder, wherein the at least one of an encoder or decoder may consist of hardware, a combination of hardware and software, or software. Although, codec 2105 is depicted as a separate component, codec 2105 may be contained within non-volatile memory 2112. By way of illustration, and not limitation, non-volatile memory 2112 can include read only memory (ROM), programmable ROM (PROM), electrically programmable ROM (EPROM), electrically erasable programmable ROM (EEPROM), or flash memory. Volatile memory 2210 includes random access memory (RAM), which acts as external cache memory. According to present aspects, the volatile memory may store the write operation retry logic (not shown in FIG. 21) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM).

Computer 2102 may also include removable/non-removable, volatile/non-volatile computer storage medium. FIG. 21 illustrates, for example, disk storage 2114. Disk storage 2114 includes, but is not limited to, devices like a magnetic disk drive, solid state disk (SSD) floppy disk drive, tape drive, Zip drive, flash memory card, or memory stick. In addition, disk storage 2114 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2114 to the system bus 2108, a removable or non-removable interface is typically used, such as interface 2116.

It is to be appreciated that FIG. 21 describes software that acts as an intermediary between users and the basic computer resources described in the suitable operating environment 2100. Such software includes an operating system 2118. Operating system 2118, which can be stored on disk storage 2114, acts to control and allocate resources of the computer system 2102. Applications 2120 take advantage of the management of resources by operating system 2118 through program modules 2124, and program data 2126, such as the boot/shutdown transaction table and the like, stored either in system memory 2106 or on disk storage 2114. It is to be appreciated that the claimed subject matter can be implemented with various operating systems or combinations of operating systems.

A user enters commands or information into the computer 2102 through input device(s) 2128. Input devices 2128 include, but are not limited to, a pointing device such as a mouse, trackball, stylus, touch pad, keyboard, microphone, joystick, game pad, satellite dish, scanner, TV tuner card, digital camera, digital video camera, web camera, microphone, and the like. These and other input devices connect to the processing unit 2104 through the system bus 2108 via interface port(s) 2130. Interface port(s) 2130 include, for example, a serial port, a parallel port, a game port, and a universal serial bus (USB). Output device(s) 2136 use some of the same type of ports as input device(s). Thus, for example, a USB port may be used to provide input to computer 2102, and to output information from computer 2102 to an output device 2136. Output adapter 2134 is provided to illustrate that there are some output devices 2136 like monitors, speakers, and printers, among other output devices 2136, which require special adapters. The output adapters 2134 include, by way of illustration and not limitation, video and sound cards that provide a means of connection between the output device 2136 and the system bus 2108. It should be noted that other devices and/or systems of devices provide both input and output capabilities such as remote computer(s) 2138.

Computer 2102 can operate in a networked environment using logical connections to one or more remote computers, such as remote computer(s) 2138. The remote computer(s) 2138 can be a personal computer, a server, a router, a network PC, a workstation, a microprocessor based appliance, a peer device, a smart phone, a tablet, or other network node, and typically includes many of the elements described relative to computer 2102. For purposes of brevity, only a memory storage device 2140 is illustrated with remote computer(s) 2138. Remote computer(s) 2138 is logically connected to computer 2102 through a network interface 2142 and then connected via communication connection(s) 2144. Network interface 2142 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2144 refers to the hardware/software employed to connect the network interface 2142 to the bus 2108. While communication connection 2144 is shown for illustrative clarity inside computer 2102, it can also be external to computer 2102. The hardware/software necessary for connection to the network interface 2142 includes, for exemplary purposes only, internal and external technologies such as, modems including regular telephone grade modems, cable modems and DSL modems, ISDN adapters, and wired and wireless Ethernet cards, hubs, and routers.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A system for adaptive user interfaces, comprising:
a user interface output component including instructions executable by a processor to output a first user interface to at least one output device;
an input tracking component including instructions executable by the processor to register user actions received from an input device configured to receive input user actions from a user interacting with the first user interface;
a user experience learning component including instructions executable by the processor to assign and/or update one or more user groupings based on output from a model that includes an input factor node layer and a groupings node layer, where current usage factors of the user, historical usage factors of the user, a user profile of the user, and additional characteristics of the user including a current situation of the user are entered into respective nodes of the input factor node layer, including entering the additional characteristics into a first set of nodes of the input factor node layer and entering the user profile of the user into a second set of nodes of the input factor node layer, where the first set of nodes is connected to the groupings node layer differently than the second set of nodes is connected to the groupings node layer; and
a user interface adaptive component including instructions executable by the processor to perform a prediction of the next intended action of the user based on at least the registered user actions and generate an adapted user interface based on the one or more user groupings and the prediction of the next intended action;
wherein the user interface output component outputs the adapted user interface.

2. The system of claim 1, wherein:
the user interface presents medical information of a patient;
the system includes instructions executable by the processor to determine, via an electronic medical record, that the patient is undergoing a medical emergency and indicate that the current situation of the user is an emergency situation; and
the adapted user interface does not include educational tips or help.

3. The system of claim 2, wherein the first set of nodes includes a medical situation factor node, the second set of nodes includes a user location node, and the groupings node layer includes a non-typical situation node, wherein the medical situation factor node has a higher influence on the non-typical situation node than the user location node, such that the user experience learning component assigns the user to the non-typical situation node in response to determining that medical situation factor node includes the patient undergoing the medical emergency.

4. The system of claim 1, wherein:
the user interface presents medical information of a patient;
the system includes instructions executable by the processor to determine, via an electronic medical record, that the patient is not undergoing a medical emergency and indicate that the current situation of the user is a non-emergency situation; and
the adapted user interface includes educational tips or help.

5. The system of claim 1, wherein the first user interface is associated with a software application, wherein the current usage factors of the user include one or more factors relating to the user interacting with the first user interface during a current session, and wherein the historical usage factors include factors relating to the user interacting with the first user interface and one or more second user interfaces associated with the software application and/or other software applications in a suite of software applications during one or more prior sessions.

6. The system of claim 1, further comprising:
an action automation component that determines if the prediction of the next intended action is an action that is easily reversible and has an obvious effect to the user; and, if so, automates the next action such that the system performs the action without requiring explicit user input.

7. The system of claim 6, wherein the action automation component determines that the next action is an adjustment to contrast of an image presented via the first user interface, and in response, the action automation component does not automate the next action.

8. The system of claim 1, wherein the user interface adaptive component includes further instructions executable by the processor to adjust a user interface paradigm based on the user profile, device information, the current usage factors of the user, and the historical usage factors of the user.

9. The system of claim 8, wherein the user profile includes how often the user interacts with other user interface paradigms, including voice interfaces, mouse-based interfaces, and touch interfaces, and wherein the device information includes the current device being used, devices nearby the user, and remote devices available to the user.

10. A method for an adaptive user interface, comprising the steps of:
outputting a first user interface to a user;
receiving input action from the user interacting with the first user interface;
recording the input action;
updating a training base with the input action;
providing a prediction of a next user action based on the training base;
determining a user experience level for the user based on a current session user interaction history, a retrieved past session user interaction history, and user profile information, including entering the current session user interaction history, the retrieved past session user interaction history, and the user profile information into a model trained to output one or more suggestions for adapting the user interface, where the current session user interaction history and the retrieved past session user interaction history are entered separately into different nodes of a first layer of the model; and
outputting an adapted user interface based on the predicted next user action and the one or more suggestions output by the model.

11. The method of claim 10, wherein updating the training base with the input action comprises adding the input action to a vector tree formed from a plurality of prior input actions of the user.

12. The method of claim 11, wherein providing the prediction of the next user action comprises providing respective probabilities for each of a plurality of possible next actions by comparing the vector tree with previous action vector trees and/or vector trees of other users.

13. The method of claim 10, wherein:
the adapted user interface includes user interface hinting, dynamic shortcuts, or automation of specific tasks.

14. The method of claim 13, wherein the user interface hinting includes highlighting one or more buttons of the adapted user interface, where a level of boldness of each highlighting is based on how likely that button is predicated to be the next user action.

15. The method of claim 13, wherein the user interface hinting includes one or more hint boxes including text, video, and/or audio selected based on the user experience level.

16. The method of claim 10, wherein the current session user interaction history is entered into a first set of nodes of the first layer of the model and the retrieved past session user interaction history is entered into a second set of nodes of the first layer of the model, wherein the model includes a second layer, and wherein the first set of nodes is connected to the second layer differently than the second set of nodes is connected to the second layer.

17. The method of claim 16, wherein the first layer is an input layer, the second layer is a groupings layer, and the model further includes a ratings layer having connections to the groupings layer and an output layer having connections to the ratings layer.

18. A method for an adaptive user interface, comprising the steps of:
determining that a user is intending to interact with a first user interface during a first session;
determining that the user has no user interface interaction history for the first user interface, and in response, outputting the first user interface having a first, smaller number of buttons;
registering input actions of the user interacting with the first user interface during the first session;
applying a learning component to assign the user at least a first user grouping based on the registered input actions during the first session;
adapting the first user interface based on the assigned at least first user grouping to generate a first adapted first user interface and outputting the first adapted first user interface;
populating the user interface interaction history for the first user interface with the registered input actions during the first session;
determining that the user is intending to interact with the first user interface during a second session;
registering input actions of the user interacting with the first user interface during the second session;
applying the learning component to assign the user to at least a second user grouping based on the registered input actions during the second session and the user interface interaction history; and
adapting the first user interface based on the assigned at least second user grouping to form a second adapted first user interface and outputting the second adapted first user interface, where the second adapted first user interface includes a second, higher number of buttons.

19. The method of claim 18, further comprising:
predicting a first next intended action of the user based on at least the registered user input actions during the first session and further adapting the first user interface based on the predicted first next intended action of the user during the first session; and
predicting a second next intended action of the user based on at least the registered user input actions during the second session and further adapting the first user interface based on the predicted first next intended action of the user during the second session, and wherein applying the learning component to assign the user to at least the second user grouping based on the registered input actions during the second session and the user interface interaction history comprises entering the registered input actions during the second session and the user interface interaction history into a first layer of a model, where the model includes a groupings layer connected to the first layer.

20. The method of claim 18, wherein predicting the first next intended action of the user based on at least the registered user input actions during the first session further comprises predicting the first next intended action of the user based on patterns and groupings of other users who have interacted with the first user interface in the past; and
wherein predicting the second next intended action of the user based on at least the registered user input actions during the second session further comprises predicting the second next intended action of the user based on the user interface interaction history, wherein the registered input actions during the second session are entered into a first set of nodes of the first layer and the user interface interaction history is entered into a second set of nodes of the first layer, the first set of nodes connected to the groupings layer differently than the second set of nodes.

* * * * *